United States Patent
Nishio et al.

(10) Patent No.: US 8,834,828 B2
(45) Date of Patent: Sep. 16, 2014

(54) FINE CARBON FIBER, FINE SHORT CARBON FIBER, AND MANUFACTURING METHOD FOR SAID FIBERS

(75) Inventors: Masayuki Nishio, Ube (JP); Tsunao Matsuura, Ube (JP); Kenji Fukuda, Ube (JP)

(73) Assignee: Ube Industries, Ltd., Ube-shi (JP)

( * ) Notice: Subject to any disclaimer, the term of this patent is extended or adjusted under 35 U.S.C. 154(b) by 247 days.

(21) Appl. No.: 12/920,769

(22) PCT Filed: Mar. 5, 2009

(86) PCT No.: PCT/JP2009/054210
§ 371 (c)(1),
(2), (4) Date: Sep. 2, 2010

(87) PCT Pub. No.: WO2009/110570
PCT Pub. Date: Sep. 11, 2009

(65) Prior Publication Data
US 2011/0003151 A1    Jan. 6, 2011

(30) Foreign Application Priority Data

Mar. 6, 2008 (JP) .................. 2008-055819
Jun. 30, 2008 (JP) .................. 2008-171186

(51) Int. Cl.
*D01F 9/12* (2006.01)
*D01F 9/127* (2006.01)

(52) U.S. Cl.
USPC ............ 423/447.3; 423/447.1; 423/447.2; 502/328; 428/367

(58) Field of Classification Search
USPC ........ 423/447.1–447.3, 445 B; 977/742–754, 977/842–848; 428/367; 502/328
See application file for complete search history.

(56) References Cited

U.S. PATENT DOCUMENTS

| 2003/0086859 A1 | 5/2003 | Kawakami et al. |
| 2004/0005269 A1 | 1/2004 | Huang et al. |
| 2004/0071990 A1 | 4/2004 | Moriyama et al. |

(Continued)

FOREIGN PATENT DOCUMENTS

| EP | 1 300 364 A2 | 4/2003 |
| EP | 2 131 422 A1 | 12/2009 |

(Continued)

OTHER PUBLICATIONS

Flahaut, et al., Graham-scale CCVD synthesis of double-walled carbon nanotubes, Chem. Commun. 2003: 1442-1443.*

(Continued)

*Primary Examiner* — Daniel C McCracken
(74) *Attorney, Agent, or Firm* — Knobbe Martens Olson & Bear LLP

(57) ABSTRACT

A novel fine carbon fiber is produced by vapor growth, in which a graphite-net plane consisting of carbon atoms alone forms a temple-bell-shaped structural unit comprising closed head-top part and body-part with open lower-end, where an angle θ formed by a generatrix of the body-part and a fiber axis is less than 15°, 2 to 30 of the temple-bell-shaped structural units are stacked sharing a central axis to form an aggregate, and the aggregates are connected in head-to-tail style with a distance, thereby forming a fiber. Furthermore, a fine short carbon fibers with excellent dispersibility can be obtained by shortening the fine carbon fiber.

9 Claims, 13 Drawing Sheets

(a)

(b)

(56) References Cited

U.S. PATENT DOCUMENTS

| | | | |
|---|---|---|---|
| 2006/0239897 A1* | 10/2006 | Moy et al. ............... | 423/447.3 |
| 2010/0111325 A1* | 5/2010 | Ma et al. ............... | 502/183 |
| 2010/0119949 A1 | 5/2010 | Yano et al. | |

FOREIGN PATENT DOCUMENTS

| | | |
|---|---|---|
| JP | A-H09-502487 | 3/1997 |
| JP | A-2003-206117 | 7/2003 |
| JP | 2003-227039 | 8/2003 |
| JP | A-2003-221217 | 8/2003 |
| JP | A-2004-238791 | 8/2004 |
| JP | A-2004-299986 | 10/2004 |
| JP | A-2004-303613 | 10/2004 |
| JP | 2005-512925 A | 5/2005 |
| JP | 2005-239531 A | 9/2005 |
| JP | A-2006-103996 | 4/2006 |
| JP | 2006-143532 A | 6/2006 |
| JP | A-2006-306960 | 11/2006 |
| JP | A-2003-221217 | 10/2007 |
| JP | A-2008-230947 | 10/2008 |
| JP | A-2008-270204 | 11/2008 |
| JP | A-2008-277128 | 11/2008 |
| JP | A-2009-272041 | 11/2009 |
| JP | A-2010-031214 | 2/2010 |
| WO | WO 95-07380 | 3/1995 |
| WO | WO 02/095097 A1 | 11/2002 |
| WO | WO 03/050333 A1 | 6/2003 |

OTHER PUBLICATIONS

Pierard, et al., Production of short carbon nanotubes with open tips by ball milling, Chemical Physics Letters 2001; 335: 1-8.*
Definition of "spinel," accessed online at <http://www.merriam-webster.com/dictionary/spinel> on Jun. 17, 2013.*
Ren, Z.F., et al., "Effect of gas pressure on the growth and structure of carbon nanotubes by chemical vapor deposition," Appl. Phys. A 73, pp. 259-264, Jun. 20, 2001.
Gadelle, P., et al., "Nanotubes and nanofilaments from carbon monoxide disproportion over Co/MgO catalysts I. Growth versus catalyst state," Carbon 41, pp. 2949-2959, (2003).
Venema et al., "Length control of individual carbon nanotubes by nanostructuring with a scanning tunneling microscope," Appl. Phys. Lett. 71 (18), Nov. 3, 1997, pp. 2629-2631.
Liu, J. et al., "Fullerene Pipes," Science, vol. 280, pp. 1253-1256, May 22, 1998.
Pierard, N. et al., Production of short carbon nanotubes with open tips by ball millings, Chemical Physics Letters 335, pp. 1-8, (2001).
Gu, Z. et al., "Cutting Single-Wall Carbon Nanotubes through Fluorination," Nano Letters, vol. 2, No. 9, pp. 1009-1013 (2002).
Taji et al., "Seminar for Solubilization and Dispersion of Carbon Nanotube in a Polymer/Solvent," Technical Information Institute Co., Ltd., Mar. 31, 2006.
International Search Report issued in corresponding PCT Application No. PCT/JP2009/054210, mailed Jun. 23, 2009.
International Preliminary Report on Patentability and Written Opinion in corresponding PCT Application No. PCT/JP2009/054210, issued Oct. 12, 2010.
Pinheiro et al., "Nanotubes and Nanofilaments from Carbon Monoxide Disproportionation Over Co/MgO Catalysts I. Growth Versus Catalyst State," Carbon 41:2949-2959, 2003.
Extended European Search Report in European Patent Application No. 10758860.0, dated Jul. 6, 2012.
"Basic of Carbon Nanotube and Frontier of Industrialization of Carbon Nanotube," NTS, Inc., pp. 246-249, Jan. 11, 2002.
Audier et al., "Morphology and Crystalline Order in Catalytic Carbons," Carbon, vol. 19, pp. 217-224 (1981).
Inagaki, Michio; "Commentary on Carbon Family," AGNE Shofusha Co., Ltd., pp. 90-91, Oct. 30, 2001.
Katayama et al., "Inorganic Material Science for Engineering," Saiensu-sha Co., Ltd., p. 29, Apr. 10, 2006.
"Experimental Chemistry Course 28—Chemistry of Nanotechnology," Chemical Society of Japan, 5$^{th}$ Edition, p. 34, Jul. 30, 2005.
"Experimental Technology on Latest Carbon Materials (Book on Analysis)," The Carbon Society of Japan, p. 157, Nov. 30, 2011.
Third Party Observation filed against counterpart European Patent Application No. 09716952.8.
Third Party Observation filed against counterpart Japanese Patent Application No. 2010-501963.
Third Party Observation filed against counterpart Japanese Patent Application No. 2009-86198.
ADI Chemistry entry for "Spinel & inverse spinel structures" available at http://www.adichemistry.com/inorganic/cochem/spinels/spinel-structures.html (last accessed on Oct. 8, 2013).
Extended European Search Report for Application No. PCT/JP2009/054210, dated May 24, 2013.
Kim et al., Effect of ball milling on morphology of cup-stacked carbon nanotubes, Chemical Physical Letters, 355 (2002) 279.
Feng et al., Controlled growth of high quality bamboo carbon nanotube arrays by the double injection chemical vapor deposition process, Materials Science and Engineering A: Structural Materials: Properties, Microstructure & Processing, v. 473, No. 1-2 (2008) 238.
Heng et al., Demonstration of the advantages of using bamboo-like nanotubes for electrochemical biosensor applications compared with single walled carbon nanotubes, Electrochemistry Communications, v. 7, No. 12 (2005) 1457.
Lu et al., Formation of bamboo-shape carbon nanotubes by controlled rapid decomposition of picric acid, Carbon, v. 42, No. 15 (2004) 3199.
Flahaut et al., CCVD Synthesis of carbon nanotubes from (Mg, Co, Mo)O catalysts: influence of the proportions of cobalt and molybdenum, Journal of Materials Chemistry, vol. 14, No. 4 (2004) 646.
Lin et al., "Dynamical Observation of Bamboo-like Carbon Nanotube Growth," Nano Letters,7(8): 2234-2238, (2007).
Office Action mailed May 8, 2014 in U.S. Appl. No. 13/381,118.

* cited by examiner (a)

(b)

(a)

(b)

FINE CARBON FIBER, FINE SHORT CARBON FIBER, AND MANUFACTURING METHOD FOR SAID FIBERS

This application is the U.S. National Phase under 35 U.S.C. §371 of International Application PCT/JP2009/054210, filed Mar. 5, 2009, designating the U.S., and published in Japanese as WO2009/110570 on Sep. 11, 2009, which claims priority to Japanese Patent Application No. 2008-055819, filed Mar. 6, 2008; and to Japanese Patent Application No. 2008-171186, filed Jun. 30, 2008, the entire contents of which are incorporated herein by reference.

TECHNICAL FIELD

The present invention relates to a fine carbon fiber and a fine short carbon fiber, which are highly conductive, as well as a process for efficiently manufacturing such a carbon fiber and a short carbon fiber. In particular, the invention relates to a process for manufacturing a fine carbon fiber by vapor growth using a catalyst, as well as a process for manufacturing a fine short carbon fiber prepared by applying shear stress to the above fine carbon fiber for further shortening.

BACKGROUND ART

Fine carbon fibers represented by, for example, a cylindrical tube type, a fish bone type (cup stack type) and a card-shaped (platelet) type are expected to be used in various applications because of their shape and morphology. In particular, a cylindrical tube type fine carbon fiber (carbon nanotube) has attracted the attention as a next-generation conducting material because it is excellent in properties such as strength and electric conductivity in comparison with conventional carbon materials.

A multilayer carbon nanotube (multilayer concentric cylindrical) (non-fish bone) is described in, for example, Japanese publication of examined application No. H03-64606, Japanese publication of examined application No. H03-77288, Japanese Laid-Open publication No. H09-502487 and Japanese Laid-Open publication No. 2004-299986.

A fish bone type carbon fiber [cup stack type carbon fiber] is described in, for example, U.S. Pat. No. 4,855,091, M. Endo, Y. A. Kim et al., {Appl. Phys. Lett., vol. 80 (2002) 1267-}, Japanese Laid-Open publication No. 2003-073928 and Japanese Laid-Open publication No. 2004-360099. This structure is a stacked open-cup shape.

A platelet type carbon nanofiber (card-shaped) is described in, for example, H. Murayama and T. Maeda {Nature, vol. 345 [No. 28] (1990) 791 to 793}, and Japanese Laid-Open publication No. 2004-300631.

Conventionally known processes for manufacturing a fine carbon fiber representatively exemplified by carbon nanotube include an arc discharge, a vapor growth, a laser and a template methods. Among these, vapor growth using catalyst particles attracts attention as an inexpensive synthetic method, but is not established in a large scale. Furthermore, carbon nanotube produced is a less crystalline inhomogeneous fiber, and therefore, graphitization is necessary when high conductivity is required.

For example, Japanese unexamined patent application publication No. H09-502487 (Patent Reference No. 1) has described that a carbon fibril material (cylindrical tube type) prepared as described in Japanese unexamined patent application publication No. H02-503334 or Japanese Laid-Open publication No. S62-500943 as a prior art has a graphite plane gap (d002) of 0.354 nm as determined by XRD (X-ray diffraction) and is insufficiently crystalline and less conductive. Furthermore, it has been described that by treating this fibril material at 2450° C., a graphite plane gap (d002) becomes 0.340 nm and a fibril material with improved crystallinity is obtained.

In carbon nanotube (multilayer concentric cylindrical type), a graphite-net plane is parallel to a fiber axis, along which electrons flow, so that conductivity is satisfactory in a long-axis direction in a single fiber. However, in terms of conductivity between adjacent fibers, jumping effect by n-electron emission (tunnel effect) cannot occur because a side peripheral surface consists of a cylindrical closed graphite-net plane. There is, therefore, a problem that in a composite with a polymer using carbon nanotube as a conductive filler, if contact between fibers is inadequate, sufficient conductivity is not obtained.

Furthermore, since a cylindrical graphite-net plane in carbon nanotube having this structure consists of a SP2-bond carbon cylinder, it is difficult to cleave strong carbon SP-2 bond by an industrial method generally used (ball mill, bead mill, or the like) for further shortening the fiber to give an industrially available fine short carbon fiber without generating structural defects in the fiber surface.

On the other hand, in a fish bone or platelet type (card-shaped) fine fiber, an open end of a graphite-net plane is exposed in a side peripheral surface, so that conductivity between adjacent fibers is improved in comparison with carbon nanotube. However, it has a stack structure where C-axis in the graphite-net plane is oblique or perpendicular to the fiber axis direction, so that conductivity in a fiber long-axis direction in a single fiber is reduced.

In terms of fiber shortening, a fish bone type carbon fiber has a structure of stacked corn-shaped carbon fundamental planes which are oblique to the fiber axis direction as described in Japanese Laid-Open publication No. 2004-241300 and allows for layer peeling between carbon fundamental planes or interlayer slipping, so that fibers can be easily further shortened. However, since conductivity in the fiber axis direction is extremely low as described above, not only a fish bone type carbon fiber but also a further shortened fiber are unsuitable as a conductive material.

A platelet type (card-shaped) also has a basic structure where stacked carbon fundamental plane disks are perpendicular to the fiber axis as in the fish bone type carbon fiber [cup stack type carbon fiber], and thus, can be easily further shortened, but not only a platelet type carbon nanofiber but also a further shortened fiber are unsuitable as a conductive material because of the reason as in the fish bone type carbon fiber.

In addition to the above structures, Japanese Laid-Open publication No. 2006-103996 (Patent Reference No. 2) has disclosed a fiber structure comprising a structural unit containing a nitrogen atom chemically bonded to a carbon atom in a core of a crystal lattice and composed of a temple-bell-shaped multilayer material in which one end is opened while the other end is closed, wherein the closed end of one unit is inserted to the open end of another unit, as well as a manufacturing process therefor. However, this fiber contains a nitrogen atom chemically bonded to a carbon atom in a graphite-net plane, so that structural distortion is introduced in the graphite-net plane, leading the problem of poor crystallinity, that is, lower conductivity.

Applied Physics A 2001 (73) 259-264 (Ren Z. F. et al) (Non-patent Reference No. 1) has also described a fiber structure called "bamboo-structure" similar to that in Patent Reference No. 2 (Japanese Laid-Open publication No. 2006-

103996) described above. This structure is synthesized by vapor growth at 750° C. using a silica-supported iron catalyst and a mixed gas of 20 vol % of acetylene/80 vol % of ammonia. Although chemical composition analysis for the fiber structure is not described at all in this reference, nitrogen which are not inert are contained in a raw material in a very high concentration (59 wt %), so that the fiber structure would also contain a nitrogen atom chemically bonded to a carbon atom, leading to structural disturbance. Furthermore, since a ratio of a product weight to a catalyst weight is as significantly low as about 6, the growth of fiber is insufficient, leading to a lower aspect ratio.

Furthermore, Carbon 2003 (41) 2949-2959 (Gadelle P. et al) (Non-patent Reference No. 2) has also described a structure in which graphite-net planes constituting a fiber have corn shape whose open ends are exposed to a fiber side peripheral surface with proper distance. In this reference, 0.2 g of a mixture of a cobalt salt and a magnesium salt coprecipitated by citric acid is activated by $H_2$ and then reacted with a source gas consisting of CO and $H_2$ ($H_2$ concentration: 26 vol %) to give 4.185 g of a product. However, in a fiber structure obtained by this process, a corn-shaped side peripheral surface forms an angle of about 22° with a fiber axis, that is, it is considerably oblique to the fiber axis. Thus, in terms of conductivity in a long-axis direction of a single fiber, there is a problem as described above for the fish bone carbon fiber. Furthermore, since an aspect ratio is lower due to insufficient fiber growth, it is difficult to give conductivity or reinforcement to a composite with a polymer. Furthermore, since a ratio of a product weight to a catalyst weight is as low as 21, the process is inefficient as a manufacturing process and impurities are contained in a large amount, leading to limited number of applications.

There have been fine carbon fibers having various structures as described above and manufacturing processes therefor, but there are few suggestions for a process for further shortening such a fine carbon fiber. Examples are as follows.

(1) Fibers are cut by applying current within a scanning tunnel microscope (STM) (Non-patent Reference No. 3). In this method, fibers are cut one by one, and therefore, the method is not suitable for large-scale production.

(2) Using a mixed acid of an acid and nitric acid, oxidative decomposition and ultrasonic cutting are simultaneously conducted (Non-patent Reference No. 4). This method has a problem that a carbon wall is significantly damaged. This method also has a problem of yield reduction due to oxidation.

(3) Ball mill cutting (Non-patent Reference No. 5). In this method, the side surface of a fiber is considerably damaged and at the same time, the fiber is contaminated by impurities from a ball mill.

(4) Cutting by heating after fluorination (Non-patent Reference No. 6). This method also has a problem in an yield because a fluorinated moiety is eliminated, and an apparatus becomes larger.

(5) Cutting in a solvent using a high-speed rotation disperser (Non-patent Reference No. 7). This method is convenient, but is not suitable for large-scale production.

List of Documents

Patent Reference No. 1: Japanese unexamined patent application publication No. H09-502487.
Patent Reference No. 2: Japanese Laid-Open publication No. 2006-103996.
Non-patent Reference No. 1: Applied Physics A 2001 (73) 259-264 (Ren Z. F. et al).

Non-patent Reference No. 2: Carbon 2003 (41) 2949-2959 (Gadelle P. et al.).
Non-patent Reference No. 3: Liesbeth C. Venema et al., Appl. Phys. Lett. 71, 2629 (1997).
Non-patent Reference No. 4: J. Liu et al., Science 280, 1253 (1998).
Non-patent Reference No. 5: N. Pierard et al., Chem. Phys. Lett. 335, 1 (2001).
Non-patent Reference No. 6: Z. Gu et al., Nano Lett. 2, 1009 (2002).
Non-patent Reference No. 7: Text in the Seminar for Solubilization and Dispersion of Carbon Nanotube in a Polymer/Solvent (Kazuyuki Taji, Technical Information Institute Co., Ltd., Mar. 31, 2006).

Problem to be Solved by the Invention

As described above, a conventional fine carbon fiber such as carbon nanotube has a problem in balance between conductivity in a long-axis direction in a single fiber and conductivity between adjacent fibers. Furthermore, there have been established no efficient manufacturing processes giving a product with stable quality, and there remains problems for commercial application in terms of a cost and technology. On the other hand, current granular carbon black cannot be satisfactory in the aspects of performance and functions in forming composite(s) with polymer(s).

A conventional fine carbon fiber such as carbon nanotube has a further problem of poor dispersibility. For example, while carbon nanotube is synthesized by a gas-phase method which is believed to be suitable for large-scale production, it forms a secondary structure in which fibers are intricately intertwined to each other, so that when it is mixed with, for example, a resin, it exhibits poor dispersibility.

An objective of the present invention is to provide a fine carbon fiber and/or a fine short carbon fiber that have/has improved dispersibility and kneading properties in forming a composite with a polymer and/or a powder, which in turn attains a composite having excellent processability, and allows a composite exhibiting excellent functions such as conductivity, thermal conductivity, slide properties and reinforcement, as well as a process for efficiently manufacturing them.

Means for Solving Problem

The present invention relates to the following items. Herein, the term, "fine carbon fiber" refers to connected carbon fibers which is prepared by vapor growth described later, as schematically shown in FIG. 2. The term, "fine short carbon fiber" refers to a carbon fiber produced by cutting some connections of a "fine carbon fiber" by applying shear-stress, as shown in FIGS. 10 and 11.

1. A fine carbon fiber produced by vapor growth, wherein a graphite-net plane consisting solely of carbon atoms forms a temple-bell-shaped structural unit comprising closed head-top part and body-part with open lower-end, where an angle θ formed by a generatrix of the body-part and a fiber axis is less than 15°,
2 to 30 of the temple-bell-shaped structural units are stacked sharing a common central axis to form an aggregate, and
the aggregates are connected in head-to-tail style with a distance to form the fiber.

2. The fine carbon fiber according to the above item 1, wherein an end of the body-part of the aggregate has an outer diameter D of 5 to 40 nm and an inner diameter d of 3 to 30 nm, and an aspect ratio (L/D) of the aggregate is 2 to 30.
3. The fine carbon fiber according to the above item 1 or 2, wherein an ash content is 4% by weight or less.
4. The fine carbon fiber according to any one of the above items 1 to 3, wherein a peak half width W (unit: degree) of 002 plane in the fine carbon fiber is 2 to 4 as determined by X-ray diffractometry.
5. The fine carbon fiber according to any one of the above items 1 to 4, wherein a graphite plane gap (d002) of the fine carbon fiber is 0.341 to 0.345 nm as determined by X-ray diffractometry.
6. A process for manufacturing a fine carbon fiber comprising feeding a mixed gas containing CO and $H_2$ onto a catalyst containing a spinel-type oxide of cobalt, in which magnesium is contained by substitution forming solid solution, to initiate a reaction and growing the fine carbon fiber.
7. The process for manufacturing a fine carbon fiber according to the above item 6, wherein when the spinel-type oxide is represented by $Mg_xCo_{3-x}O_y$, "x" which is a solid solution range of magnesium is 0.5 to 1.5.
8. The process for manufacturing a fine carbon fiber according to the above item 6 or 7, wherein in the spinel-type oxide, a crystal lattice constant "a" (cubic system) is 0.811 to 0.818 nm as determined by X-ray diffraction measurement.
9. The process for manufacturing a fine carbon fiber according to any one of the above items 6 to 8, wherein a volume ratio of $CO/H_2$ in the mixed gas is within the range of 70/30 to 99.9/0.1 and a reaction temperature is within the range of 400 to 650° C.
10. A fine short carbon fiber prepared by shortening a fine carbon fiber produced by vapor growth, wherein a graphite-net plane forms a temple-bell-shaped structural unit comprising closed head-top part and body-part with open lower-end, 2 to 30 of the temple-bell-shaped structural units are stacked sharing a central axis to form an aggregate, and one to several tens of the aggregates are connected in head-to-tail style.
11. The fine short carbon fiber according to the above item 10, wherein the generatrix of the body-part and the fiber axis form an angle θ of less than 15°.
12. The fine short carbon fiber according to the above item 10 or 11, wherein an end of the body-part of the aggregate has an outer diameter D of 5 to 40 nm and an inner diameter d of 3 to 30 nm, and an aspect ratio (L/D) of the aggregate is 2 to 30.
13. The fine short carbon fiber according to any one of the above items 10 to 12, wherein an ash content is 4% by weight or less.
14. The fine short carbon fiber according to any one of the above items 10 to 13, wherein a peak half width W (unit: degree) of 002 plane in the fine carbon fiber is 2 to 4 as determined by X-ray diffractometry.
15. The fine short carbon fiber according to any one of the above items 10 to 14, wherein a graphite plane gap (d002) of the fine carbon fiber is 0.341 to 0.345 nm as determined by X-ray diffractometry.
16. A fine short carbon fiber produced by shortening the carbon fiber according to any one of the above items 1 to 5 by applying shear stress.
17. A process for manufacturing a fine short carbon fiber, comprising preparing a fine carbon fiber by the manufacturing process according to any one of the above items 6 to 9 and then applying shear stress to the fiber for shortening.
18. The use of the fine short carbon fiber according to any one of the above items 10 to 16 as an electrical conductive material, an electrical conductivity assisting material, a heat-conducting material, a slide material or a polishing material.

Effect of the Invention

A fine carbon fiber of the present invention has a fiber structure in which an open end of a graphite-net plane constituting the fiber is exposed in the side peripheral surface of the fiber with an appropriate distance and the side peripheral surface consisting of the graphite-net plane forms a small angle with the fiber axis. The bond of this fine carbon fiber in the direction of the fiber axis in the temple-bell-shaped structural unit aggregate is a continuous carbon SP2 bond, whose bonding strength is large and good conductivity can be achieved in the fiber axis direction. Furthermore, the fiber has regions where open ends of the graphite-net planes are exposed in the side peripheral surface of the fiber with an appropriate distance at a frequency in terms of aspect ratio of about 2 to 150 along the fiber axis direction of this carbon fiber. Thus, conductivity in a long-axis direction in a single fiber and conductivity between adjacent fibers can be well balanced.

Furthermore, in the region around open-end of the temple-bell-shaped structural unit aggregate, a bonding part is formed with carbon fundamental planes that are oblique to the fiber axis. In other words, this bonding part is a part where temple-bell-shaped structural unit aggregates are bonded each other mainly by the bonding between the carbon fundamental planes, that is, weak bonding force of van der Waals force. Therefore, when shear stress is applied to this part, it can easily cause sliding between the carbon fundamental planes, so that the temple-bell-shaped structural unit aggregate slides off or is pulled out of the bonding part, resulting in cutting of the fiber.

A method for shortening the fine carbon fiber into the fine short carbon fiber is, as a procedure, the same as the ball mill cutting method described in (3) as a conventional fiber-shortening method. However, in a conventional fine carbon fiber, the substantially whole fiber is connected by carbon SP2 bond, and therefore, cleaving this bond requires enormous amount of energy and the outer wall of the fiber after cutting is considerably damaged. In contrast, a fine carbon fiber of the present invention has a structure where temple-bell-shaped structural unit aggregates are bonded via van der Waals force, and therefore, the bonding part can be cleaved with a relatively smaller energy and furthermore, the fiber can be shortened by a small energy, so that the fine short carbon fiber obtained can be undamaged. Furthermore, fiber shortening with a small energy means small impact on a ball mill vessel and balls and thus, it is also a distinctive feature that contamination due to scraping of such vessel or balls is reduced. This is confirmed by the facts that, in the fibers described in Table 2 (Reference Example B1 and Example B1-6), a carbon layer gap as determined by XRD is little changed before and after fiber shortening, that true specific gravity is substantially unchanged, and that a surface area does not increase corresponding to fiber shortening.

Furthermore, according to the process for manufacturing a fine carbon fiber, a fine carbon fiber less contaminated with impurities can be efficiently produced, so that a fine short carbon fiber prepared by applying shear stress to the above fiber is also highly pure and fiber shortening, that is, separation between bonding sites, does not require much energy, resulting in less contamination by impurities from a ball mill and the like. Furthermore, the use of a fine short carbon fiber of the present invention reduces energy required for homogeneously mixing the fiber with a resin or a powder. For example, since mixing with a resin does not require a large shear force at a high temperature, manufacturing of a conductive composite which keeps characteristic resin properties can be obtained. In mixing with solid materials, a conductive composition keeping characteristic solid properties can be manufactured without damaging the crystallinity of the solid materials.

EXPLANATION OF THE SYMBOLS

11: structural unit
12: head-top part
13: body-part
21, 21a, 21b, 21c: aggregate

BEST MODE FOR CARRYING OUT THE INVENTION

Figure 1:
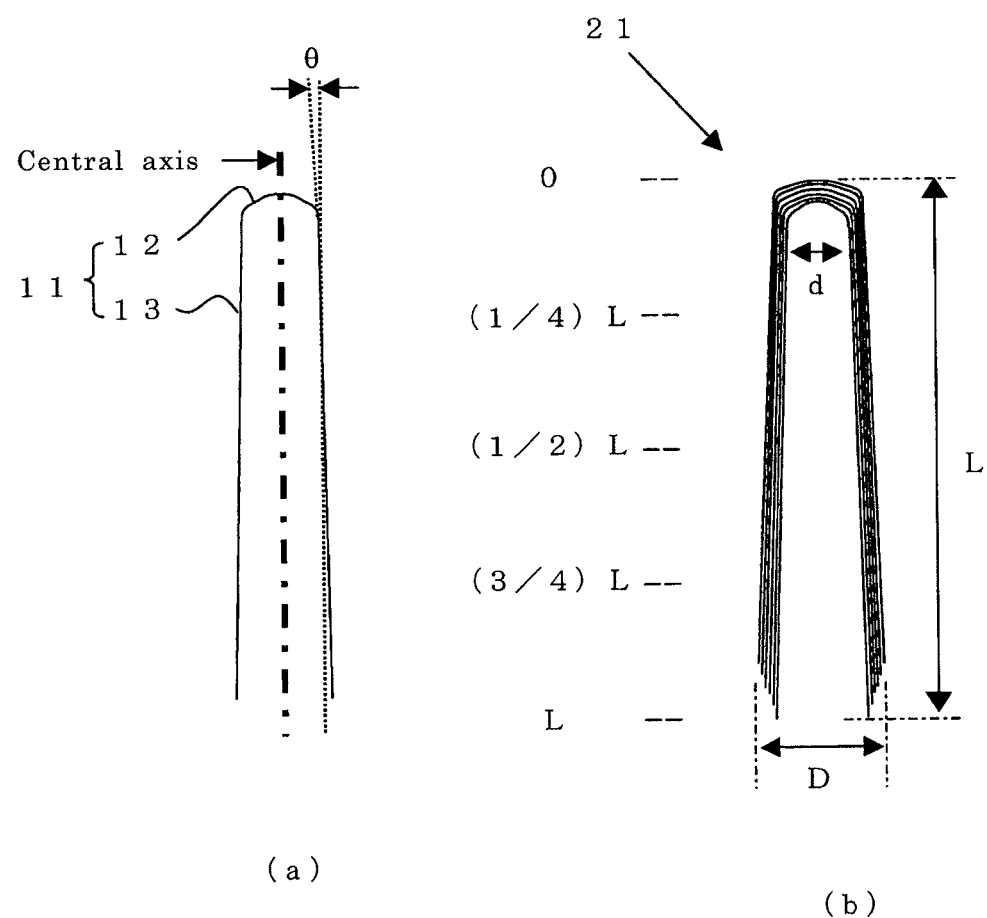
FIG. 1(a) is a drawing schematically showing a minimal structural unit (temple-bell-shaped structural unit) constituting a fine carbon fiber.
FIG. 1(b) is a drawing schematically showing an aggregate consisting of 2 to 30 stacked temple-bell-shaped structural units.
Figure 2:
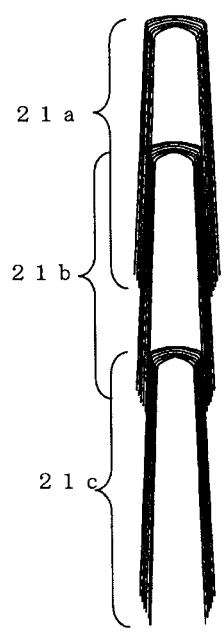
FIG. 2(a) is a drawing schematically showing connecting aggregates with a certain distance to form a fiber.
FIG. 2(b) is a drawing schematically showing curved connection when aggregates are connected with a certain distance.
Figure 2:
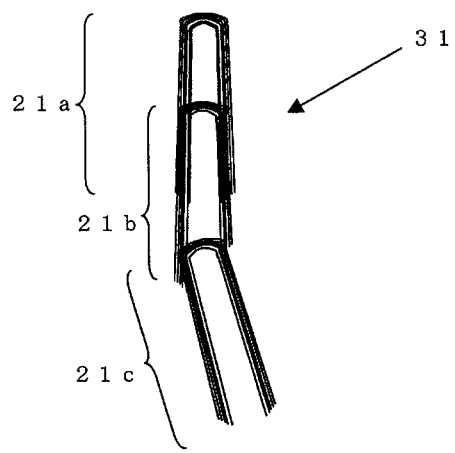

A fine carbon fiber and a fine short carbon fiber of the present invention has a temple-bell-shaped structure as shown in FIG. 1(a) as a minimal structural unit. A temple bell is commonly found in Japanese temples, which has a relatively cylindrical-shaped body-part, which is different from a Christmas bell that is very close to cone-shape. As shown in FIG. 1(a), a structural unit 11 has a head-top part 12 and a body-part 13 having an open end like a temple bell and approximately has a shape as a body of rotation formed by rotation about a central axis. The structural unit 11 is constituted by a graphite-net plane consisting solely of carbon atoms, and the circumference of the open-end of the body-part is the open end of the graphite-net plane. Here, although the central axis and the body-part 13 are, for convenience, indicated by a straight line in FIG. 1(a), they are not necessarily straight, but may be curved as shown in FIGS. 3, 8, 10 and 11 described later.

The body-part 13 is gradually enlarged toward the open-end side, and as a result, the generatrix of the body-part 13 is slightly oblique to the central axis of the temple-bell-shaped structural unit and an angle formed θ by these is less than 15°, more preferably 1°<θ<15°, further preferably 2°<θ<10°. With an excessively large θ, a fine fiber constituting from the structural units has a structure like a fish bone carbon fiber, leading to deterioration in conductivity in a fiber axis direction. On the other hand, with a smaller θ, it has a structure like a cylindrical tube and thus the open end of the graphite-net plane constituting the body-part in the structural unit are less exposed in the outer circumference surface of the fiber, leading to deterioration in conductivity between adjacent fibers.

A fine carbon fiber and a fine short carbon fiber of the present invention have defects and irregular disturbances, but when their shape is observed as a whole neglecting such irregularity, it can be said that they have a temple-bell-shaped structure where the body-part 13 is gradually enlarged toward the open end side. In terms of a fine short carbon fiber and a fine carbon fiber of the present invention, the above description does not mean that θ is within the above range in all parts, but means that when the structural unit 11 is observed as a whole neglecting defects and irregular parts, θ generally is within the above range. Therefore, in determination of θ, it is preferable to eliminate an area near the head-top part 12 where a thickness of the body-part irregularly varies. More specifically, for example, when a length of a temple-bell-shaped structural unit aggregate 21 (see, the description below) is "L" as shown in FIG. 1(b), θ may be measured at three points (¼)L, (½)L and (¾)L from the head-top part side and an average of the measured values is determined and the average may be regarded as θ for the whole structural unit 11. "L" is ideally measured in a straight line, but actually, the body-part 13 is often curved, and therefore, it can be measured along the curve in the body-part 13 to give a substantially more real value.

When produced as a fine carbon fiber (the same goes for a fine short carbon fiber), the head-top part has a shape which is smoothly connected to the body-part and convexly curved to the upper side (in the figure). A length of the head-top part is typically about "D" (see FIG. 1(b)) or less, sometimes about "d" (see FIG. 1(b)) or less, wherein "D" and "d" will be described for a temple-bell-shaped structural unit aggregate.

Furthermore, as described later, active nitrogen is not used as a starting material, so that other atoms such as nitrogen are not contained in the graphite-net plane of the temple-bell-shaped structural unit. Thus, the fiber exhibits excellent crystallinity.

In a fine carbon fiber and a fine short carbon fiber of the present invention, as shown in FIGS. 1(b), 2 to 30 of such temple-bell-shaped structural units are stacked sharing a central axis, to form a temple-bell-shaped structural unit aggregate 21 (hereinafter, sometimes simply referred to as an "aggregate"). The stack number is preferably 2 to 25, more preferably 2 to 15.

An outer diameter "D" of the body-part of the aggregate 21 is 5 to 40 nm, preferably 5 to 30 nm, further preferably 5 to 20 nm. A diameter of a fine fiber increases as "D" increases, so that in a composite with a polymer, a large amount needs to be added for giving particular functions such as conductivity. On the other hand, as "D" decreases, a diameter of a fine fiber decreases, so that fibers tend to more strongly agglomerate each other, leading to, for example, difficulty in dispersing them in preparation of a composite with a polymer. A body-part outer diameter "D" is determined preferably by measuring it at three points (¼)L, (½)L and (¾)L from the head-top part of the aggregate and calculating an average. Although FIG. 1(b) shows a body-part outer diameter "D" for convenience sake, an actual "D" is preferably an average of the measured values at the above three points.

An inner diameter "d" of the body-part of the aggregate is 3 to 30 nm, preferably 3 to 20 nm, further preferably 3 to 10 nm. Again, a body-part inner diameter "d" is determined preferably by measuring it at three points (¼)L, (½)L and (¾)L from the head-top part of the temple-bell-shaped structural unit aggregate and calculating an average. Although FIG. 1(b) shows a body-part inner diameter "d" for convenience sake, an actual "d" is preferably an average of the measured values at the above three points.

An aspect ratio (L/D) calculated from a length "L" of the aggregate 21 and a body-part outer diameter "D" is 2 to 150, preferably 2 to 30, more preferably 2 to 20, further preferably 2 to 10. With a larger aspect ratio, a fiber formed has a structure of a more cylindrical tube and conductivity in a fiber axis direction in a single fiber is improved, but the open ends of the graphite-net planes constituting the body-part of the structural units are less frequently exposed in the circumferential surface of the fiber, leading to deterioration in conductivity between adjacent fibers. On the other hand, with a smaller aspect ratio, the open ends of the graphite-net planes constituting the body-part of the structural units are more frequently exposed in the circumferential surface of the fiber, so that conductivity between adjacent fibers can be improved, but a fiber circumferential surface is constituted by a number of connected short graphite-net planes in a fiber axis direction, leading to deterioration in conductivity in a fiber axis direction in a single fiber.

A fine carbon fiber and a fine short carbon fiber of the present invention share an essentially common configuration for a temple-bell-shaped structural unit and a temple-bell-shaped structural unit aggregate, but a fiber length is different as described below.

First, a fine carbon fiber of the present invention is formed by connecting the aggregates in a head-to-tail style as shown in FIG. 2(a). A head-to-tail style means that in a configuration of the fine carbon fiber, a bonding site between adjacent aggregates is formed from a combination of the head-top part (head) of one aggregate and the lower end (tail) of the other aggregate. As a specific style of bonding the part, the head-top part of the outermost temple-bell-shaped structural unit in the second aggregate 21b is inserted into the inner part of the innermost temple-bell-shaped structural unit at a lower opening of a first aggregate 21a; and furthermore, the head-top part of a third aggregate 21c is inserted into the lower opening of a second aggregate 21b, and a number of such combinations are serially connected to form a fiber.

Each bonding part forming one fine fiber of the fine carbon fibers does not have structural regularity; for example, a length of a bonding part between a first aggregate and a second aggregate in a fiber axis direction is not necessarily equal to a length of a bonding part between the second aggregate and a third aggregate. Furthermore, as shown in FIG. 2(a), two aggregates bonded share a common central axis and may be connected in a straight line, but as in the temple-bell-shaped structural unit aggregates 21b and 21c shown in FIG. 2(b), they may be bonded without sharing a central axis, resulting in a curved structure in the bonding part. A length "L" of the temple-bell-shaped structural unit aggregate is approximately constant in each fiber. However, since in vapor growth, starting materials and byproduct gaseous components and a catalyst and a solid product component exist in mixture, a temperature distribution may occur in a reaction vessel; for example, a local site at a temporarily higher temperature generates depending on a flowing state of the above heterogeneous reaction mixture of a gas and a solid during an exothermic carbon precipitating reaction, possibly resulting in variation in a length "L" to some extent.

In the fine carbon fiber thus constituted, at least some of the open ends of the graphite-net planes in the lower end of the temple-bell-shaped structural units are exposed in the fiber circumferential surface, depending on a connection distance of the aggregates. Consequently, without conductivity in a fiber axis direction in a single fiber being deteriorated, conductivity between adjacent fibers can be improved due to jumping effect by π-electron emission (tunnel effect) as described above. Such a fine carbon fiber structure can be observed by a TEM image. Furthermore, it can be believed that the effects of a fine carbon fiber of the present invention are little affected by curving of the aggregate itself or curving of the connection part of the aggregates. Therefore, parameters associated with a structure can be determined by observing an aggregate having a relatively straight part in a TEM image, as the structural parameters (θ, D, d, L) for the fiber.

Next, a fine short carbon fiber of the present invention is prepared by further shortening the fine carbon fiber thus formed. Specifically, shear stress is applied to the fine carbon fiber, to cause sliding between graphite fundamental planes in the aggregate bonding part, so that the fine carbon fiber is shortened at some of the bonding parts of the aggregates to give a shorter fiber. The fine short carbon fiber formed by such fiber shortening is as short as a fiber length of 1 to about several ten aggregates (that is, 100 or less, up to about 80, preferably up to about 70), preferably one to 20 aggregates which are connected. An aspect ratio of the aggregates in this fine short carbon fiber is about 2 to 150. An aspect ratio of the aggregates in the fine short carbon fiber which is suitable for mixing is 2 to 50. Even when shear stress is applied, cleavage does not occur in a fiber straight body-part of the fiber consisting of carbon SP2 bonds in the aggregate, so that the fiber cannot be cut into a unit smaller than an aggregate.

Also in the fine short carbon fiber, since the end surface of the graphite net is exposed, conductivity between adjacent fibers is as high as a fine carbon fiber before fiber shortening due to jumping effect by π-electron emission (tunnel effect) as described above while conductivity in a fiber axis in a single fiber is not deteriorated. A structure of a fine short carbon fiber after fiber shortening as described above can be observed by a TEM image (see FIGS. 10 and 11). Furthermore, it can be believed that the effects of the fine short carbon fiber are little affected by curving of the aggregate itself or curving of the bonding part of the aggregates. In the fine short carbon fiber in FIG. 10, four temple-bell-shaped structural unit aggregates of 4-a to 4-d are connected as shown in the figure, and for each, θ and an aspect ratio (L/D) are 4-a: θ=4.8°, (L/D)=2.5; 4-b: θ=0.5°, (L/D)=2.0; 4-c: θ=4.5°, (L/D)=5.0; 4-d: θ=1.1°, (L/D)=5.5. In the fine short carbon fiber in FIG. 11, four temple-bell-shaped structural unit aggregates of 5-*a* to 5-*d* are connected as shown in the figure and for each, θ and an aspect ratio (L/D) are 5-*a:* θ=10°, (L/D)=4.3; 5-*b:* θ=7.1°, (L/D)=3.4; 5-*c:* θ=9.5°, (L/D)=2.6; 5-*d:* θ=7.1°, (L/D)=4.3.

In XRD by Gakushin-method of a fine carbon fiber and a short carbon fiber, a peak half width W (unit: degree) of 002 plane measured is within the range of 2 to 4. If W is more than 4, graphite exhibits poor crystallinity and poor conductivity. On the other hand, if W is less than 2, graphite exhibits good crystallinity, but at the same time, fiber diameter becomes large, so that a larger amount is required for giving functions such as conductivity to a polymer.

A graphite plane gap d002 as determined by XRD using Gakushin-method of a fine carbon fiber and a short carbon fiber is 0.350 nm or less, preferably 0.341 to 0.348 nm. If d002 is more than 0.350 nm, graphite crystallinity is deteriorated and conductivity is reduced. On the other hand, a fiber of 0.341 nm is produced in a low yield in the production.

The ash content contained in the fine carbon fiber and the short carbon fiber of the present invention is 4% by weight or less, and therefore, purification is not necessary for a common application. Generally, it is 0.3% by weight or more and 4% by weight or less, more preferably 0.3% by weight or more and 3% by weight or less. The ash content is determined from a weight of an oxide as a residue after combustion of 0.1 g or more of a fiber.

A short carbon fiber of the present invention has a fiber length of preferably 100 to 1000 μm, more preferably 100 to 300 μm. A fine short carbon fiber having such a length in which a peak half width W (unit: degree) of the above 002 plane is 2 to 4 and a graphite plane gap d002 is 0.350 nm or less, preferably 0.341 to 0.348 nm is a novel fiber which is not known in the prior art.

There will be described a process for manufacturing a fine carbon fiber and a short carbon fiber of the present invention. A fine short carbon fiber of the present invention is produced by shortening a fine carbon fiber.

Process for Manufacturing a Fine Carbon Fiber

First, a process for manufacturing a fine carbon fiber is as follows. Using a catalyst which is an oxide of cobalt having a spinel type crystal structure containing magnesium by substitution forming solid solution, vapor growth is conducted supplying a mixed gas containing CO and $H_2$ to the catalyst particles to produce a fine carbon fiber.

A spinel type crystal structure of cobalt where Mg is substituted forming solid solution is represented by $Mg_xCo_{3-x}O_y$. In this formula, x is a number indicating substitution of Co by Mg, and nominally, 0<x<3. Furthermore, y is a number selected such that electric charge of the whole formula becomes neutral, and is formally a number of 4 or less. That is, a spinel-type oxide of cobalt $Co_3O_4$ contains divalent and trivalent Co ions, and when divalent and trivalent cobalt ions are represented by $Co^{II}$ and $Co^{III}$, respectively, a cobalt oxide having a spinel type crystal structure is represented by $Co^{II}Co^{III}_2O_4$. Both sites of $Co^{II}$ and $Co^{III}$ are substituted by Mg to form a solid solution. After the solid solution formation by substitution with Mg for $Co^{III}$, electric charge is kept to be neutral and thus y is less than 4. However, both x and y have a value within a range that a spinel type crystal structure can be maintained.

For the use as a catalyst, a solid solution range of Mg represented by x is preferably 0.5 to 1.5, more preferably 0.7 to 1.5. A solid solution amount as x of less than 0.5 results in poor catalyst activity, leading to production of a fine carbon fiber in a lower yield. If x is more than 1.5, it is difficult to produce a spinel type crystal structure.

A spinel-type oxide crystal structure of the catalyst can be confirmed by XRD, and a crystal lattice constant "a" (cubic system) is within the range of 0.811 to 0.818 nm, more preferably 0.812 to 0.818 nm. If "a" is small, substitutional solid solution formation with Mg is inadequate and catalyst activity is low. The above spinel-type oxide crystal having a lattice constant larger than 0.818 nm is difficult to produce.

We suppose that such a catalyst is suitable because solid solution formation by substitution with magnesium in the spinel structure oxide of cobalt provides a crystal structure as if cobalt is dispersedly placed in magnesium matrix, so that under the reaction conditions, aggregation of cobalt is inhibited.

A particle size of the catalyst can be selected as appropriate and for example, is 0.1 to 100 μm, preferably 0.1 to 10 μm as a median diameter.

Catalyst particles are generally placed on an appropriate support such as a substrate or a catalyst bed by an appropriate application method such as spraying, for use. Spraying catalyst particles on a substrate or catalyst bed can be conducted by directly spraying the catalyst particles or spraying a suspension of the particles in a solvent such as ethanol and then drying it to spray a desired amount.

It is also preferable that catalyst particles are activated before being reacted with a source gas. Activation is generally conducted by heating under a gas atmosphere containing $H_2$ or CO. Such activation can be conducted by diluting the above gas with an inert gas such as He and $N_2$ as necessary. A temperature at which activation is conducted is preferably 400 to 600° C., more preferably 450 to 550° C.

There are no particular restrictions to a reactor for vapor growth, which can be conducted using a reactor such as a fixed-bed reactor and a fluidized-bed reactor.

A mixed gas containing CO and $H_2$ is used as a source gas to be a carbon source in vapor-phase growth.

An addition concentration of $H_2$ gas $\{(H_2/(H_2+CO)\}$ is preferably 0.1 to 30 vol %, more preferably 2 to 20 vol %. When the addition concentration is too low, cylindrical graphite net planes form a carbon-nanotube-like structure parallel to a fiber axis. On the other hand, if it is more than 30 vol %, the angle of the temple-bell-shaped structure oblique to the fiber axis of a carbon side peripheral surface becomes larger and similar to a fish-bone shape, leading to lower conductivity in a fiber direction.

The source gas can contain an inert gas. Examples of such an inert gas include $CO_2$, $N_2$, He and Ar. The inert gas is preferably contained in such an amount that it does not significantly reduce a reaction rate; for example, 80 vol % or less, preferably 50 vol % or less. Furthermore, a synthetic gas containing $H_2$ and CO or a waste gas such as a steel converter exhaust gas can be, as necessary, used after appropriate treatment.

A reaction temperature for conducting vapor-phase growth is preferably 400 to 650° C., more preferably 500 to 600° C. If a reaction temperature is too low, a fiber does not grow. On the other hand, if a reaction temperature is too high, an yield is reduced. A reaction time is, but not limited to, for example, 2 hours or more and about 12 hours or less.

In terms of a reaction pressure, vapor-phase growth can be conducted at an ambient pressure from the viewpoint of convenience of a reactor or operation, but as long as carbon growth of Boudouard equilibrium proceeds, the reaction can be conducted under the pressurized or reduced-pressure condition.

It has been demonstrated that according to this manufacturing process for a fine carbon fiber, an yield of a fine carbon fiber per a unit weight of the catalyst is considerably higher than that in a conventional manufacturing process, for example, the method described in Non-patent Reference No. 2. An yield of a fine carbon fiber according to this manufacturing process for a fine carbon fiber is 40 folds or more, for example 40 to 200 folds per a unit weight of the catalyst. As a result, a fine carbon fiber containing reduced amount of impurities and ash content as described above can be produced.

Although a process of forming the bonding part unique to the fine carbon fiber prepared by this manufacturing process for a fine carbon fiber is not clearly understood, it is speculated that balance between exothermic Boudouard equilibrium and heat removal by source-gas flowing causes variation of a temperature near the fine cobalt particles formed from the catalyst, so that carbon growth intermittently proceeds, resulting in formation of the bonding part. In other words, it is speculated that four processes: [1] formation of a head-top part of a temple-bell-shaped structure, [2] growth of a body-part in the temple-bell-shaped structure, [3] pause of growth due to temperature increase caused by the processes [1] and [2], and [4] cooling by a flowing gas, are repeated on fine catalyst particles, to form the bonding part unique to a fine carbon fiber structure.

Manufacturing Process for a Fine Short Carbon Fiber

As described above, a fine carbon fiber of the present invention can be produced. Next, a fine short carbon fiber of the present invention can be produced by separating a fine carbon fiber to shorten it. Preferably, it is prepared by applying shear stress to the fine carbon fiber. Suitable examples of a specific fiber shortening method include those using a grinder, a tumbling ball mill, a centrifugal ball mill, a centrifugal planetary ball mill, a bead mill, a microbead mill, an attriter type high-speed ball mill, a rotating rod mill, a vibrating rod mill, a roll mill and a three-roll mill. The fiber shortening of the fine carbon fiber may be conducted in wet-process or dry-process. Wet fiber shortening may be conducted in the presence of either a resin or a resin and a filler. Since fine carbon fibers before fiber shortening aggregate like a fluff ball, the presence of a small medium capable of loosening such a ball can accelerate shredding and fiber shortening. Furthermore, coexistence of a fine filler allows for shortening of the fine carbon fiber and mixing and dispersing the filler can be conducted at the same time. An atmosphere in dry fiber shortening can be selected from an inert atmosphere or an oxidative atmosphere, depending on a purpose.

The reason why the fine carbon fiber can be easily shortened by applying shear stress is due to the structure of the fine carbon fiber. Specifically, it is because a fine carbon fiber is formed from temple-bell-shaped structural unit aggregates connected in a head-to-tail style with a distance. When shear stress is applied to the fiber, the fiber is pulled to the fiber axis direction indicated by an arrow in FIG. 9, and then sliding occurs between carbon fundamental planes constituting a bonding part (in FIG. 9, see region A: "two sticks" shape which is Japanese katakana "ha"), and one to several ten temple-bell-shaped structural unit aggregates are pulled off at the head-to-tail bonding parts, resulting in fiber shortening. That is, the head-to-tail bonding part is not formed by consecutive carbon double bonds in a fiber axis direction like a concentric fine carbon fiber, but formed by bonds mainly via van der Waals force with a lower bond energy. In Table 2 of Examples, when crystallinity is compared between a fine carbon fiber and a fine short carbon fiber of the present invention prepared by shortening the above fine carbon fiber (Reference Example B1 and Examples B1-1 to B1-6) on the basis of a carbon layer gap and a true specific gravity, difference is not observed in carbon crystallinity between these. However, in comparison with the fine carbon fiber, the fine short carbon fiber of the present invention after fiber shortening has a larger surface area by about 2 to 5%. Increase of a surface area to this extent would be due to fiber shortening, indicating that shortening of a fine carbon fiber is caused by the pulling-off of the temple-bell-shaped structural unit aggregates simply from their bonding sites, while carbon crystallinity of the temple-bell-shaped structural unit aggregates in the fine carbon fiber is not deteriorated.

A fine short carbon fiber of the present invention is effective for providing conductivity or helping providing conductivity to various resins or inorganic materials. In particular, regardless of a shape such as spherical, whisker, flat and nanoparticles, it is effective for providing conductivity or helping providing conductivity to a nonconductive or less conductive inorganic material such as half metal, oxide, fluoride, nitride, carbide, boride, sulfide and hydride, particularly a solid material used as a battery material. Furthermore, a fine short carbon fiber according to the present invention is useful, besides the use in providing conductivity or helping providing conductivity, as a heat-conducting material, a slide material and a filler for a reinforcement or a polishing material by forming a complex with a resin or inorganic material, utilizing higher thermal conductivity and slide properties and higher tensile strength and elastic modulus which are peculiar to carbon having a graphite structure.

EXAMPLES

There will be described Examples of the present invention together with Comparative Examples.

Example A1

In 500 mL of ion-exchanged water were dissolved 115 g of cobalt nitrate [$Co(NO_3)_2 \cdot 6H_2O$: molecular weight 291.03] (0.40 mol) and 102 g of magnesium nitrate [$Mg(NO_3)_2 \cdot 6H_2O$: molecular weight 256.41] (0.40 mol), to prepare raw-material solution (1). Furthermore, 220 g of powdery ammonium bicarbonate [$(NH_4)HCO_3$: molecular weight 79.06] (2.78 mol) was dissolved in 1100 mL of ion-exchanged water, to prepare raw-material solution (2). Next, raw-material solutions (1) and (2) were mixed at a reaction temperature of 40° C., after which the mixture was stirred for 4 hours. The precipitate formed was filtered, washed and then dried.

The product was calcined and pulverized with a mortar to provide 43 g of a catalyst. A crystal lattice constant "a" (cubic system) of the spinel structure in this catalyst was 0.8162 nm, and a metallic element ratio in the spinel structure of the substitutional solid solution was Mg:Co=1.4:1.6.

A quartz reaction tube (inner diameter: 75 mmϕ, height: 650 mm) was perpendicularly fixed and in its center was placed a support of silica wool on which was then dispersed 0.9 g of the catalyst. Under He atmosphere, the tube was heated to a furnace temperature of 550° C., and then a mixed gas consisting of CO and $H_2$ (volume ratio: CO/$H_2$=95.1/4.9) as a source gas was fed from the bottom of the reaction tube at a flow rate of 1.28 L/min for 7 hours, to synthesize a fine carbon fiber.

An yield was 53.1 g, and an ash content was determined as 1.5% by weight. A peak half width "W" (degree) observed in XRD analysis of the product was 3.156 and d002 was 0.3437 nm. Furthermore, from a TEM image, parameters related to the dimensions of temple-bell-shaped structural units constituting the fine carbon fiber obtained and the aggregate of these were D=12 nm, d=7 nm, L=114 nm, L/D=9.5, θ=0 to 7° (average: about 3°). A stack number of the temple-bellshaped structural units constituting the aggregate was 4 to 5. Here, D, d and θ were determined for three points (¼)L, (½)L and (¾)L from the head-top of the aggregate.

Figure 3:
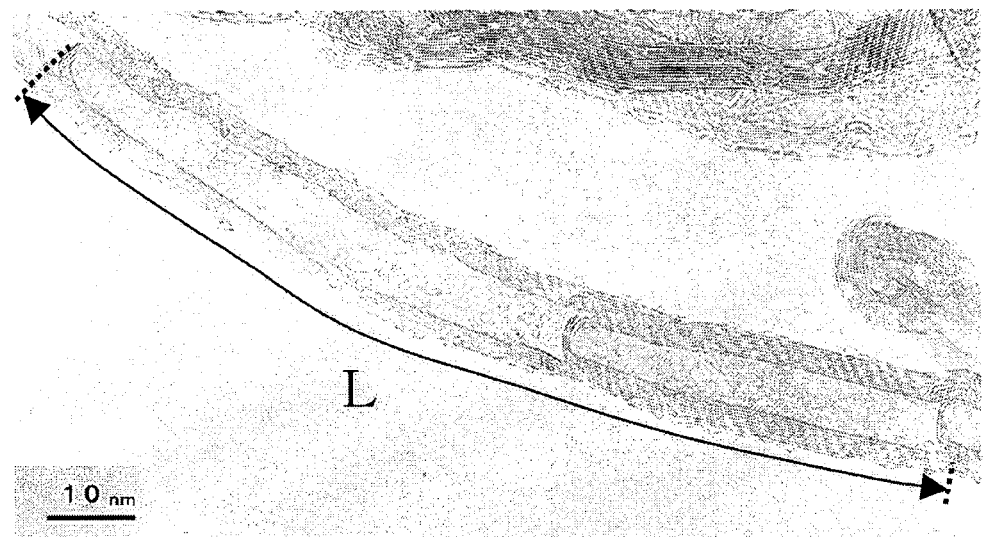
FIG. 3 is a TEM photographic image of a fine carbon fiber prepared in Example A1.

FIG. 3 shows a TEM image of the fine carbon fiber prepared in Example A1.

Example A2

In 900 mL of ion-exchanged water was dissolved 123 g of cobalt nitrate [$Co(NO_3)_2 \cdot 6H_2O$: molecular weight 291.03] (0.42 mol) and then was added 17 g of magnesium oxide [MgO: molecular weight 40.30] (0.42 mol), and the mixture was mixed to prepare raw-material slurry (1). Furthermore, 123 g of powdery ammonium bicarbonate [$(NH_4)HCO_3$: molecular weight 79.06] (1.56 mol) was dissolved in 800 mL of ion-exchanged water, to prepare raw-material solution (2). Next, raw-material slurry (1) and raw-material solution (2) were mixed at room temperature, after which the mixture was stirred for 2 hours. The precipitate formed was filtered, washed and then dried. The product was calcined and pulverized with a mortar to provide 48 g of a catalyst. A crystal lattice constant "a" (cubic system) of a spinel structure in this catalyst was 0.8150 nm, and a metallic element ratio in the spinel structure of the substitutional solid solution was Mg:Co=1.2:1.8.

A quartz reaction tube (inner diameter: 75 mmφ, height: 650 mm) was perpendicularly fixed and in its center was placed a support of silica wool on which was then dispersed 0.3 g of the catalyst. Under He atmosphere, the tube was heated to a furnace temperature of 500° C., and then from the bottom of the reaction tube, $H_2$ was fed at a flow rate of 0.60 L/min for 1 hour to activate the catalyst. Then, under He atmosphere, the tube was heated to a furnace temperature of 575° C. and then a mixed gas consisting of CO and $H_2$ (volume ratio: $CO/H_2$=92.8/7.2) as a source gas was fed at a flow rate of 0.78 L/min for 7 hours, to synthesize a fine carbon fiber.

An yield was 30.8 g and an ash content was 0.6% by weight. A peak half width "W" (degree) observed in XRD analysis of the product was 3.141 and d002 was 0.3433 nm. Furthermore, from a TEM image, parameters related to the dimensions of temple-bell-shaped structural units constituting the fine carbon fiber obtained and the aggregate of these were D=10 nm, d=5 nm, L=24 nm, L/D=2.4, θ=1 to 14° (average: about 6°). A stack number of the temple-bell-shaped structural units constituting the aggregate was 4 to 5. Here, D, d and θ were determined for three points (¼)L, (½)L and (¾)L from the head-top of the aggregate.

Figure 4:
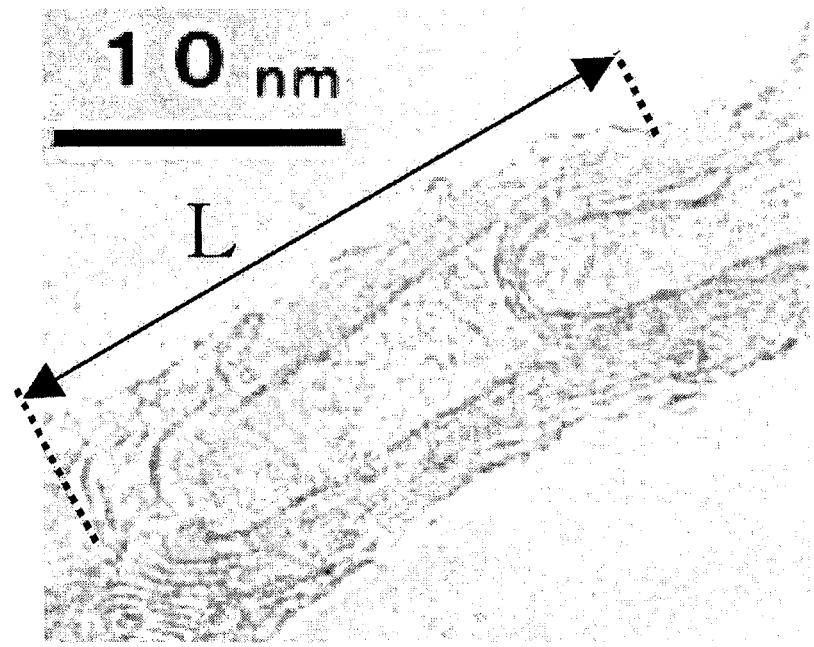
FIG. 4 is a TEM photographic image of a fine carbon fiber prepared in Example A2.

FIG. 4 shows a TEM image of the fine carbon fiber prepared in Example A2.

Example A3

A catalyst was prepared as described in Example A1, using 86 g of magnesium acetate [$Mg(OCOCH_3)_2 \cdot 4H_2O$: molecular weight 214.45] (0.40 mol) in place of magnesium nitrate. A crystal lattice constant "a" (cubic system) of a spinel structure in the catalyst thus prepared was 0.8137 nm, and a metallic element ratio in the spinel structure of the substitutional solid solution was Mg:Co=0.8:2.2.

A quartz reaction tube (inner diameter: 75 mmφ, height: 650 mm) was perpendicularly fixed and in its center was placed a support of silica wool on which was then dispersed 0.6 g of the catalyst. Under He atmosphere, the tube was heated to a furnace temperature of 500° C., and then from the bottom of the reaction tube, $H_2$ was fed at a flow rate of 0.60 L/min for 1 hour to activate the catalyst. Then, under He atmosphere, the tube was heated to a furnace temperature of 590° C. and then a mixed gas consisting of CO and $H_2$ (volume ratio: $CO/H_2$=84.8/15.2) as a source gas was fed at a flow rate of 0.78 L/min for 6 hours, to synthesize a fine carbon fiber.

An yield was 28.2 g and an ash was 2.3% by weight. A peak half width "W" (degree) observed in XRD analysis of the product was 2.781 and d002 was 0.3425 nm. Furthermore, from a TEM image, parameters related to the dimensions of temple-bell-shaped structural units constituting the fine carbon fiber obtained and the aggregate of these were D=12 nm, d=5 nm, L=44 nm, L/D=3.7, θ=0 to 3° (average: about 2°). A stack number of the temple-bell-shaped structural units constituting the aggregate was 13. Here, D, d and θ were determined for three points (¼)L, (½)L and (¾)L from the head-top of the aggregate.

Figure 5:
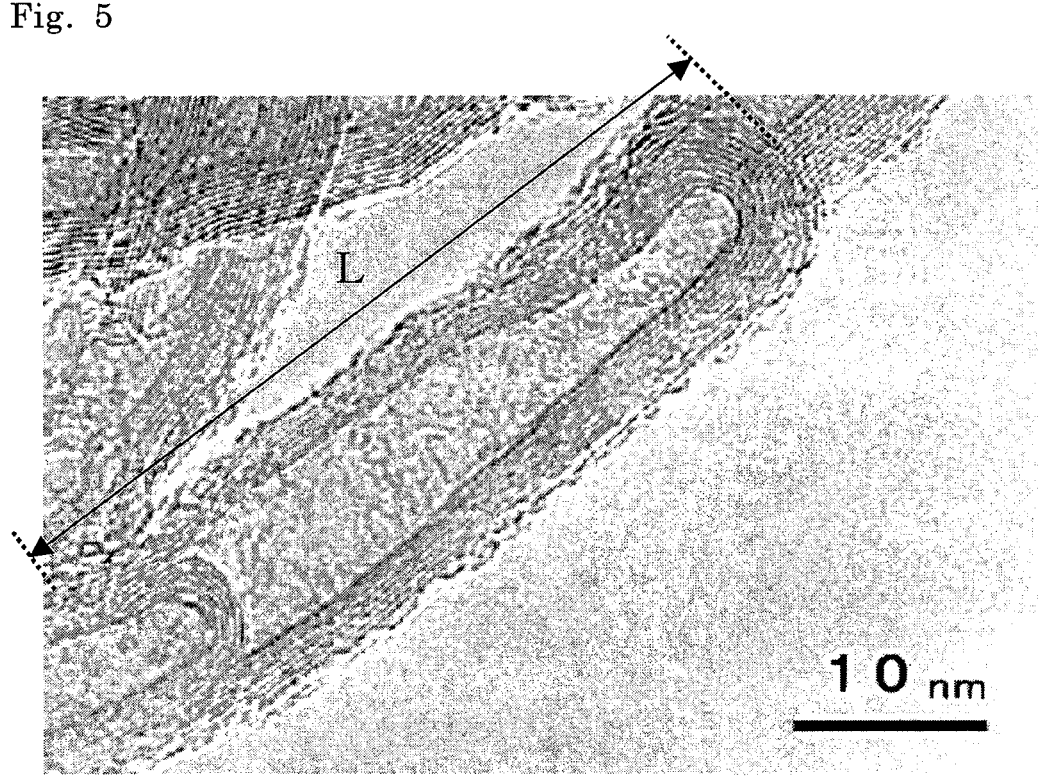
FIG. 5 is a TEM photographic image of a fine carbon fiber prepared in Example A3.

FIG. 5 shows a TEM image of the fine carbon fiber prepared in Example A3.

Comparative Example A1

A catalyst was prepared as described in Example A1, except that magnesium nitrate was not used, and the amounts of powdery ammonium bicarbonate and ion-exchanged water for dissolving the powder were changed to 110 g and 550 mL, respectively. A crystal lattice constant "a" (cubic system) of the spinel structure in the catalyst thus obtained was 0.8091 nm. Using this catalyst, the procedure described in Example A2 was conducted, but the reaction little proceeded and a material was recovered at a weight substantially equal to that of the charged catalyst.

Reference Example A1

A quartz reaction tube (inner diameter: 75 mmφ, height: 650 mm) was perpendicularly fixed and in its center was placed a support of silica wool on which was then dispersed 0.6 g of the catalyst prepared in Example A2. Under He atmosphere, the tube was heated to a furnace temperature of 500° C., and then from the bottom of the reaction tube, $H_2$ was fed at a flow rate of 0.60 L/min for 1 hour to activate the catalyst. Then, under He atmosphere, the tube was heated to a furnace temperature of 650° C. and then a mixed gas consisting of CO and $H_2$ (volume ratio: $CO/H_2$=60/40) as a source gas was fed at a flow rate of 0.78 L/min for 6 hours, to synthesize a fine carbon fiber.

An yield was 11.2 g and an ash content was 6.1% by weight. A peak half width "W" (degree) observed in XRD analysis of the product was 2.437 and d002 was 0.3424 nm. Furthermore, from a TEM image, parameters related to the dimensions of temple-bell-shaped structural units constituting the fine carbon fiber obtained and the aggregate of these were D=9 nm, d=6 nm, L=13 nm, L/D=1.4, θ=9 to 36° (average: about 19°). A stack number of the temple-bell-shaped structural units constituting the aggregate was 5. Here, D, d and θ were determined for three points (¼)L, (½)L and (¾)L from the head-top of the aggregate.

Figure 6:
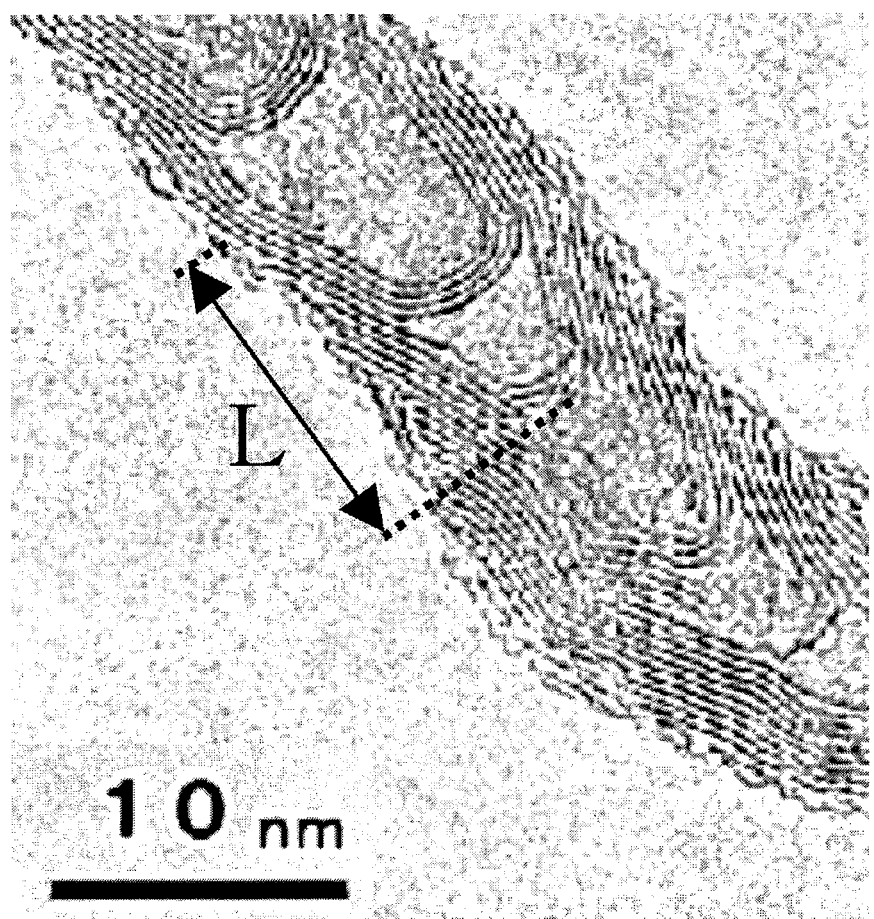
FIG. 6 is a TEM photographic image of a fine carbon fiber prepared in Reference Example A1.

FIG. 6 shows a TEM image of the fine carbon fiber prepared in Reference Example A1.

Evaluation Experiment

In a resin vessel with a diameter of 2 cm was charged 0.5 g of a fine carbon fiber shown in Table 1, and under pressure by a press, a powder resistance was measured. Catalysts used are as follows.

Evaluation Example 1: the fine carbon fiber prepared in Example A1;

Evaluation Example 2: the fine carbon fiber prepared in Example A2;

Evaluation Example 3: a commercially available multi-layer carbon nanotube (Reagent No. 677248 from Aldrich);

Evaluation Example 4: the fine carbon fiber prepared in Reference Example A1.

TABLE 1

| Evaluation Example 1 | | Evaluation Example 2 | | Evaluation Example 3 | | Evaluation Example 4 | |
|---|---|---|---|---|---|---|---|
| Press pressure (MPaG) | Volume resistivity ($\Omega \cdot$ cm) | Press pressure (MPaG) | Volume resistivity ($\Omega \cdot$ cm) | Press pressure (MPaG) | Volume resistivity ($\Omega \cdot$ cm) | Press pressure (MPaG) | Volume resistivity ($\Omega \cdot$ cm) |
| 1.0 | 0.086 | 1.0 | 0.087 | 0.7 | 0.088 | 0.7 | 0.147 |
| 1.4 | 0.077 | 1.4 | 0.079 | 1.1 | 0.082 | 1.1 | 0.130 |
| 2.0 | 0.069 | 1.8 | 0.071 | 1.5 | 0.076 | 1.6 | 0.116 |
| 2.7 | 0.062 | 2.4 | 0.063 | 2.2 | 0.070 | 2.5 | 0.101 |
| 3.9 | 0.055 | 3.4 | 0.057 | 3.1 | 0.064 | 3.9 | 0.087 |
| 5.8 | 0.048 | 4.9 | 0.050 | 4.7 | 0.058 | 6.1 | 0.074 |
| 8.5 | 0.042 | 7.1 | 0.044 | 7.2 | 0.051 | 10 | 0.063 |
| 12.5 | 0.038 | 11.2 | 0.038 | 11.3 | 0.045 | 11 | 0.061 |

Figure 7:
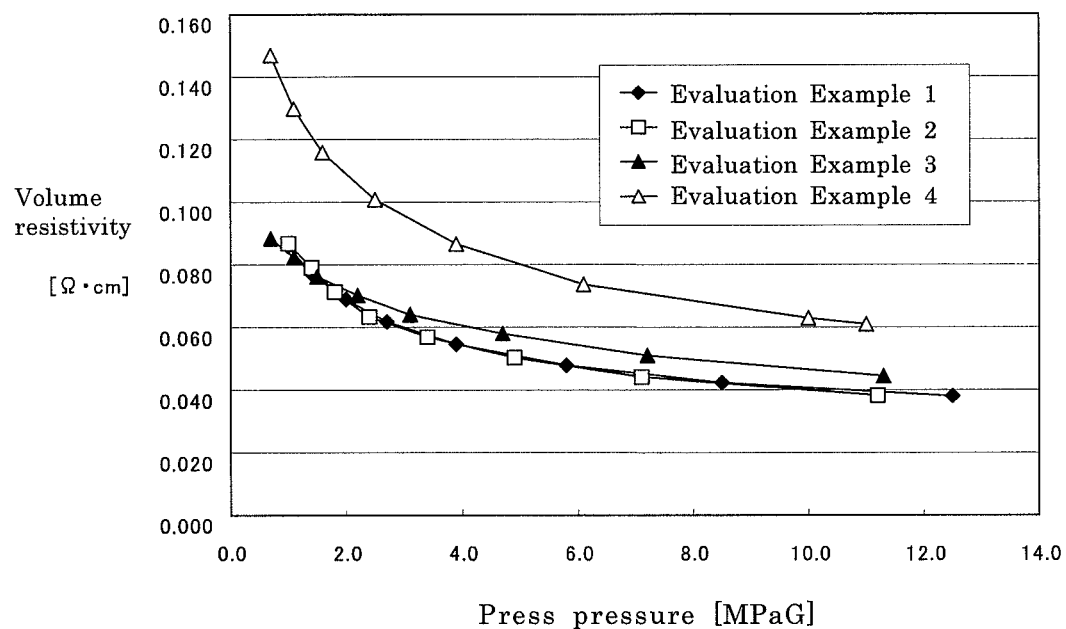
FIG. 7 is a graph summarizing the evaluation experiment results.

As seen in FIG. 7, a low volume resistivity was obtained with an equal press pressure in Evaluation Examples 1 and 2 in contrast to Evaluation Examples 3 and 4. This indicates that in comparison with a carbon fiber used in a cylindrical tube structure (Evaluation Example 3) or a structure like a fish bone carbon fiber (Evaluation Example 4), a fine carbon fiber of the present invention has improved conductivity performance because it is well balanced in conductivity in a long-axis direction in a single fiber and conductivity between adjacent fibers from its structural features. Thus, for example, it can exercise good conductivity performance in a composite with a polymer.

Example A4

A quartz reaction tube (inner diameter: 75 mm$\phi$, height: 650 mm) was perpendicularly fixed and in its center was placed a support of silica wool on which was then dispersed 0.2 g of the catalyst prepared in Example A2. A source gas was a mixed gas consisting of CO, $CO_2$, $N_2$ and $H_2$ (volume ratio: $CO/CO_2/N_2/H_2$=67.4/16.1/15.3/1.2) supposing an exhaust gas from an LD (Linz-Donawitz) steel converter. The source gas corresponded the gas in which oxygen and water had been removed from the LD-steel converter exhaust gas, and a blend ratio was determined in accordance with Carbon 1992(30), 975-979 (Ishioka M. et al.). After the tube was heated at a furnace temperature of 560° C. under He atmosphere, the above mixed gas was fed from the bottom of the reaction tube at a flow rate of 1.3 L/min, to synthesize a fine carbon fiber.

An yield was 8.4 g and an ash content was 1.7% by weight. A peak half width "W" (degree) observed in XRD analysis of the product was 3.533 and d002 was 0.3440 nm. Furthermore, from a TEM image, parameters related to the dimensions of temple-bell-shaped structural units constituting the fine carbon fiber obtained and the aggregate of these were D=12 nm, d=5 nm, L=84 nm, L/D=7.0, θ=0 to 2° (average: about 1°). A stack number of the temple-bell-shaped structural units constituting the aggregate was 13. Here, D, d and θ were determined for three points (¼)L, (½)L and (¾)L from the head-top of the aggregate.

Figure 8:
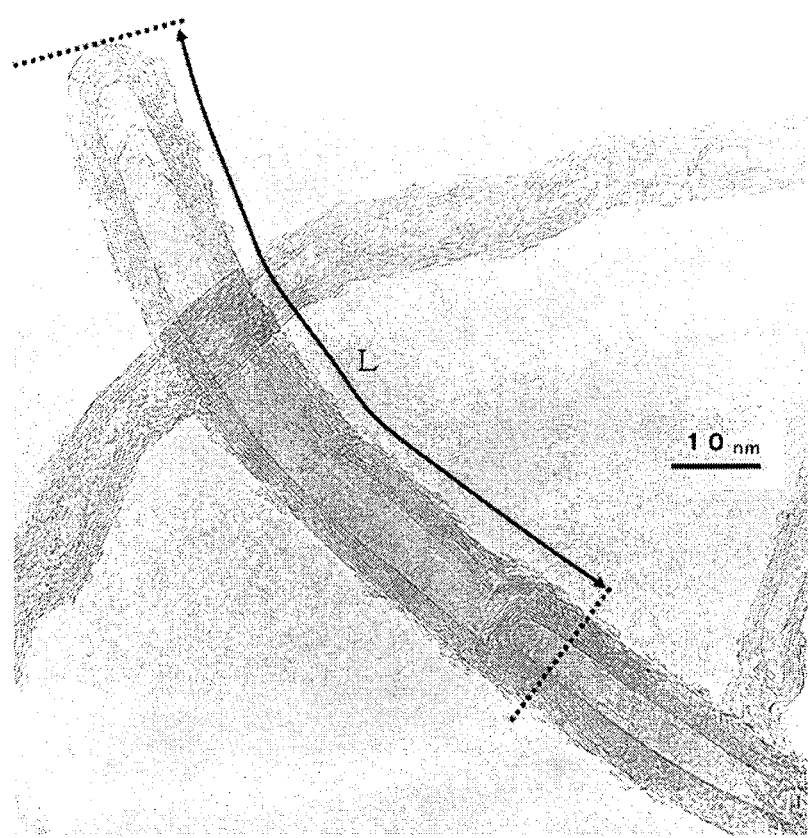
FIG. 8 is a TEM photographic image of a fine carbon fiber prepared in Example A3.
Figure 9:
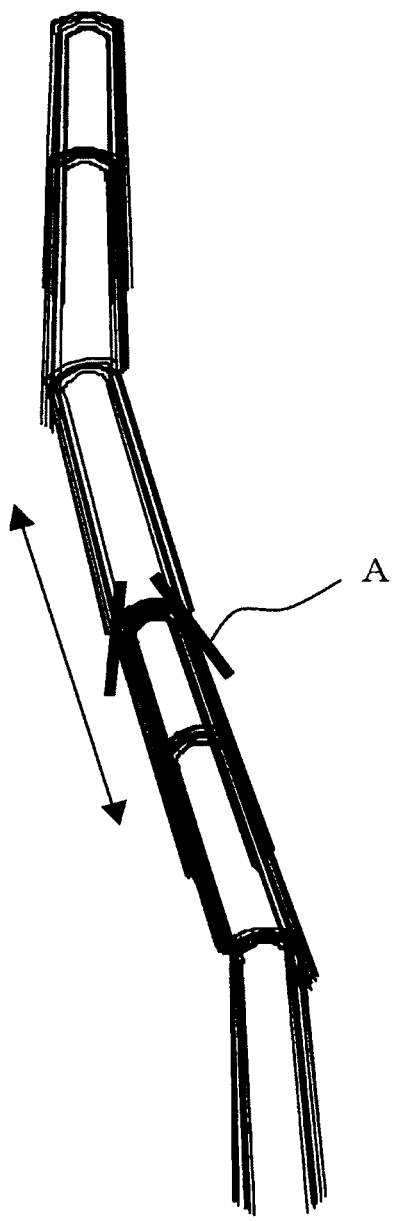
FIG. 9 a schematic drawing showing that a fine carbon fiber is pulled out to form a fine short carbon fiber by shear stress.

FIG. 8 shows a TEM image of the fine carbon fiber prepared in Example A4.

Next, there will be described a production example of a fine short carbon fiber.

Example B1

In 500 mL of ion-exchanged water were dissolved 115 g of cobalt nitrate [$Co(NO_3)_2 \cdot 6H_2O$: molecular weight 291.03] (0.40 mol) and 102 g of magnesium nitrate [$Mg(NO_3)_2 \cdot 6H_2O$: molecular weight 256.41] (0.40 mol), to prepare raw-material solution (1). Furthermore, 220 g of powdery ammonium bicarbonate [$(NH_4)HCO_3$: molecular weight 79.06] (2.78 mol) was dissolved in 1100 mL of ion-exchanged water, to prepare raw-material solution (2). Next, raw-material solutions (1) and (2) were mixed at a reaction temperature of 40° C., after which the mixture was mixed with stirring for 4 hours. The precipitate formed was filtered, washed and then dried.

The product was calcined and pulverized with a mortar to provide 43 g of a catalyst. A crystal lattice constant "a" (cubic system) of a spinel structure in this catalyst was 0.8162 nm, and a metallic element ratio in the spinel structure of the substitutional solid solution was Mg:Co=1.4:1.6.

A quartz reaction tube (inner diameter: 75 mm$\phi$, height: 650 mm) was perpendicularly fixed and in its center was placed a support of silica wool on which was then dispersed 0.9 g of the catalyst. Under He atmosphere, the tube was heated to a furnace temperature of 545° C., and then a mixed gas consisting of CO and $H_2$ (volume ratio: $CO/H_2$=95.5/4.5) as a source gas was fed from the bottom of the reaction tube at a flow rate of 1.45 L/min for 7 hours, to synthesize a fine carbon fiber.

An yield was 56.7 g, and an ash content was determined as 1.4% by weight. A peak half width "W" (degree) observed in XRD analysis of the product was 3.39 and d002 was 0.3424 nm.

Figure 10:
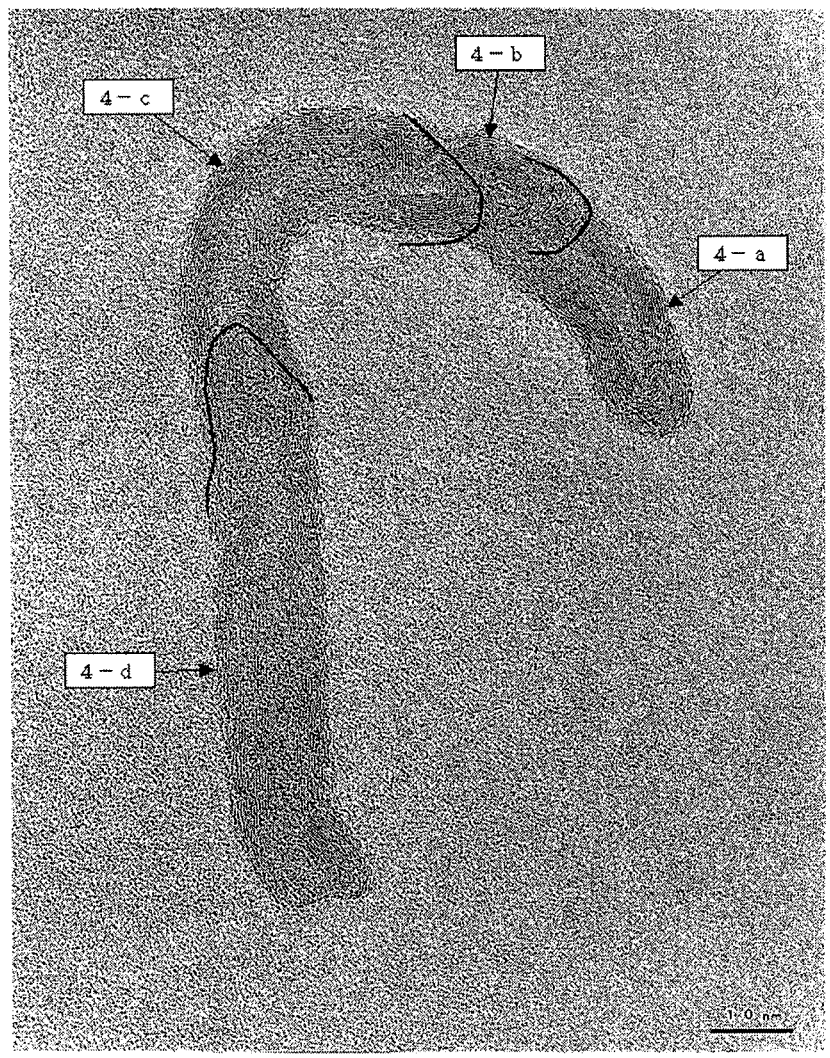
FIG. 10 is a TEM image of a fine short carbon fiber shortened in Example B1-6.
Figure 11:
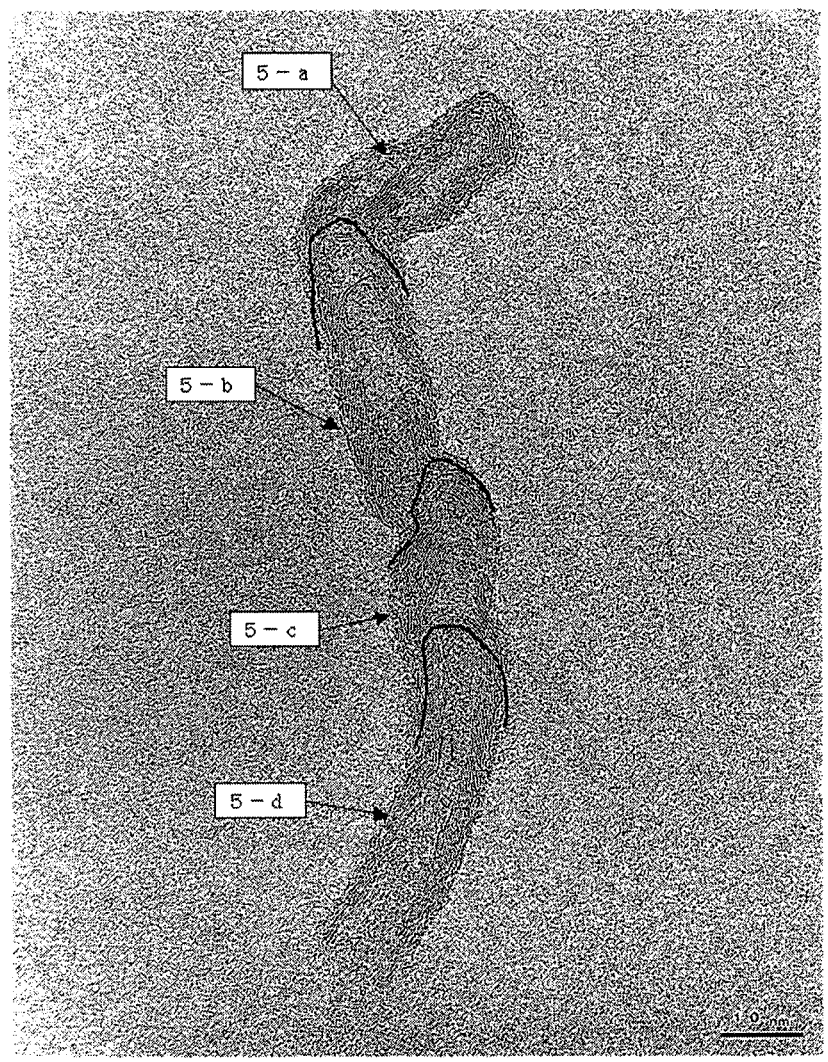
FIG. 11 is a TEM image of a fine short carbon fiber shortened in Examples B1-6 as shown in FIG. 10.

A fine carbon fibers thus obtained was treated by a ceramic ball mill with a diameter of 2 mm for a predetermined time to prepare a fine short carbon fiber. FIGS. 10 and 11 show TEM images of a fine short carbon fiber after 20 hours. From the TEM images in FIGS. 10 and 11, parameters related to the dimensions of temple-bell-shaped structural units constituting the fine short carbon fiber thus obtained and the aggregate of these were D=10.6 to 13.2 nm, L/D=2.0 to 5.5, θ=0.5° to 10°. Here, θ is an inclination average of the right and the left carbon layers to the center of the fiber axis in the TEM image. A stack number of the temple-bell-shaped structural units forming the aggregate was 10 to 20.

In a vessel were mixed 100 parts by weight of carbon-coated low-conductivity solid $LiFePO_4$, 5 parts by weight of a binder PVDF, 5 parts by weight of a fine short carbon fiber as an electrical conductivity assisting material and 110 parts by weight of a solvent NMP, and the mixture was kneaded at 1200 rpm for 20 min using NBK-1 kneader from Nippon Seiki Co., Ltd., and the kneaded slurry was applied on a polyimide film and then dried to form a film. Table 3 shows a processing time of fiber shortening by a ball mill as well as a thickness and a surface resistance of a film prepared using fine short carbon fibers (Examples B1-1 to B1-6) obtained with the processing time being varied. Also, Table 3 shows, for comparison, a thickness and a surface resistance of a film prepared by molding as described above, using a fine carbon fiber which was not shortened (Reference Example B1), acetylene black (Comparative Example B2), Ketjen black EC-600JD (Comparative Example B3) as an electrical conductivity assisting material.

Figure 12:
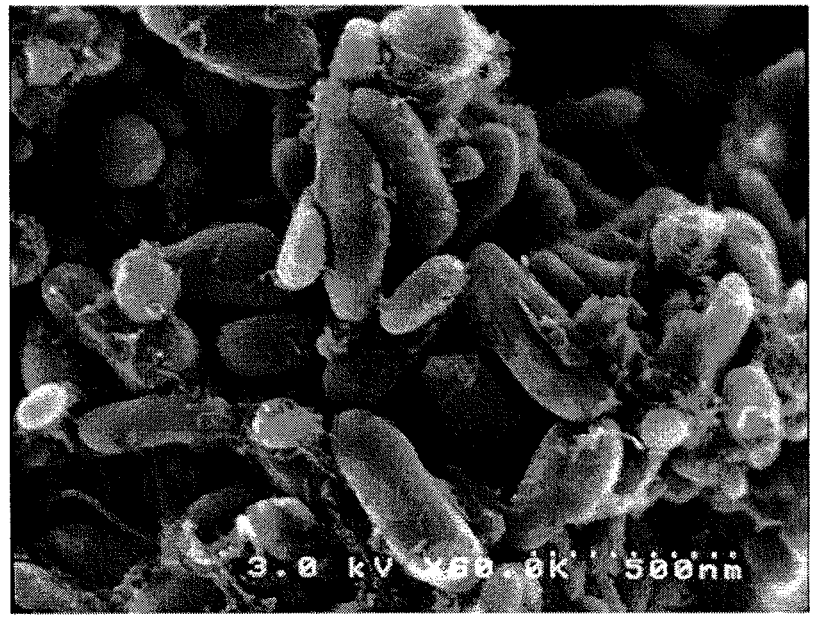
FIG. 12 is a SEM image showing dispersion of a fine short carbon fiber shortened in Example B1-6 in carbon-coated LiFePO$_4$.
Figure 13:
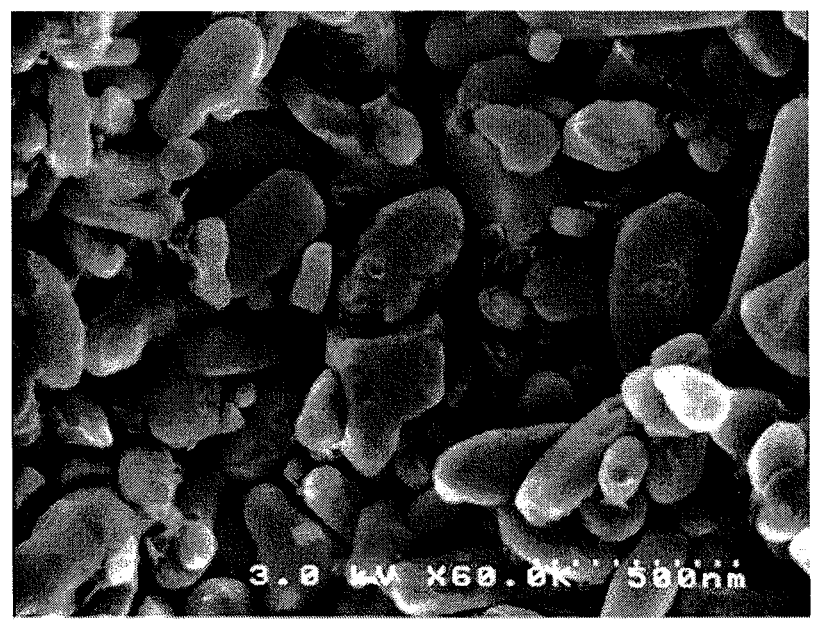
FIG. 13 is a SEM image showing dispersion of a fine carbon fiber of Reference Example B1 before fiber-shortening in carbon-coated LiFePO$_4$.
Figure 14:
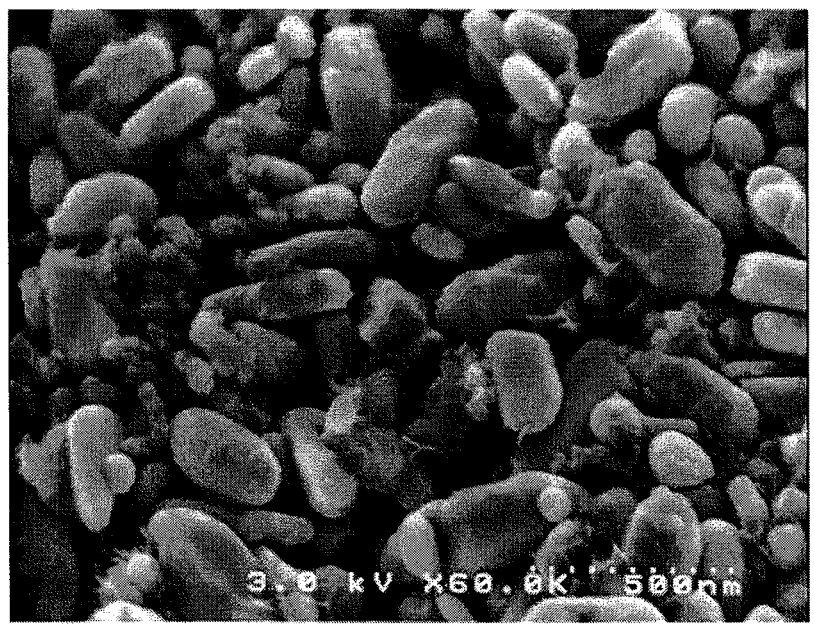
FIG. 14 is a SEM image showing dispersion of acetylene black in carbon-coated LiFePO$_4$ in Comparative Example B2.
Figure 15:
FIG. 15 is a SEM image of dispersion of Ketjen black in carbon-coated LiFePO$_4$ in Comparative Example B3.
Figure 16:
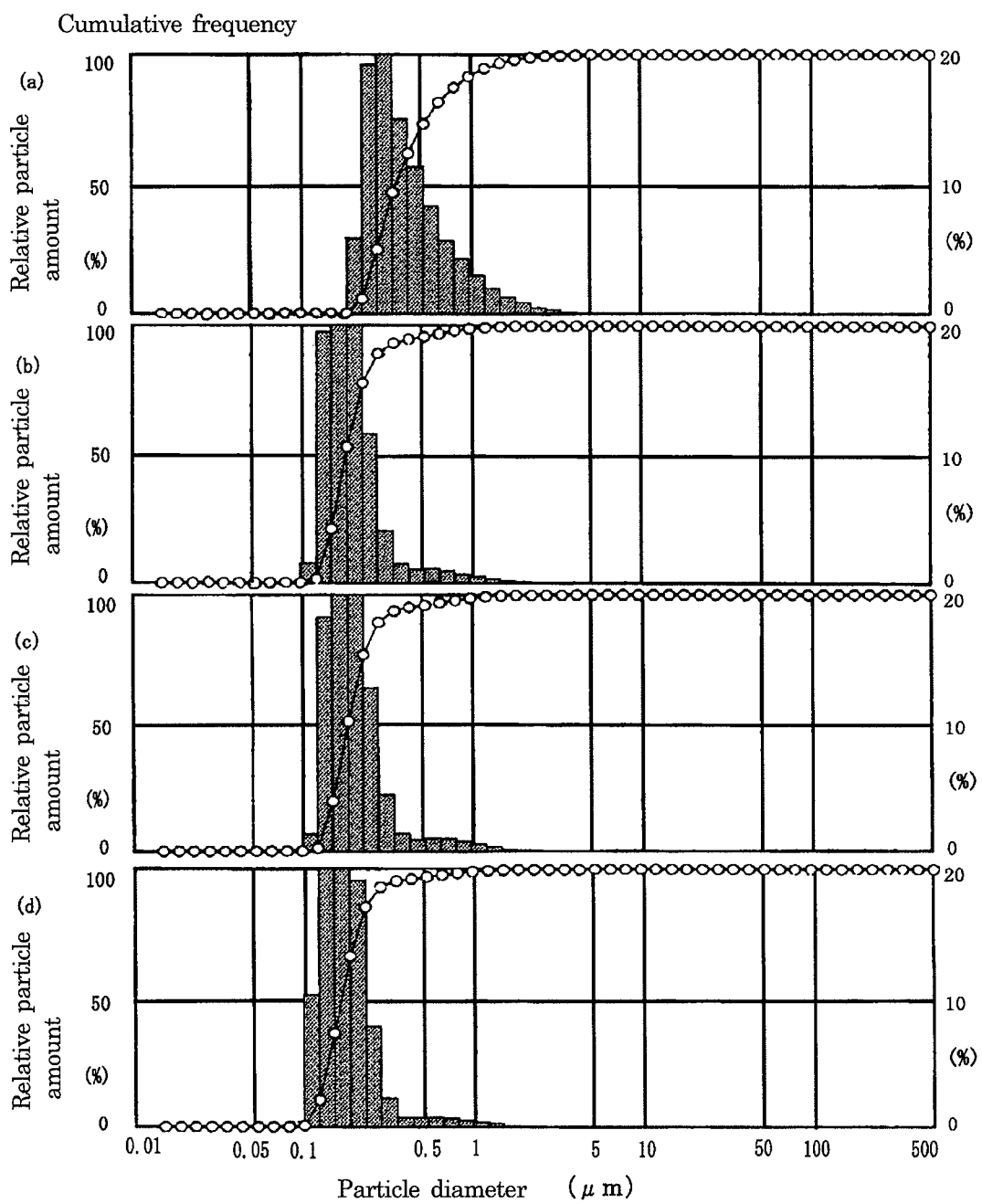
FIG. 16 shows variation in particle size distribution (fiber-length distribution) by ball milling (a; before ball milling, b; 6 hour ball milling, c; 12 hour ball milling, and d; 24 hour ball milling).

Table 2 shows the basic physical properties of electrical conductivity assisting materials used in Examples, Reference Examples and Comparative Examples. In Table 2, a thickness of the stacked electrical conducting material carbon layers of Comparative Example B3 is not described because a half width in the XRD profile of Ketjen black was too large to be calculated, and an electrical conducting material true specific gravity of Comparative Example B2 and Comparative Example B3 is not described because the sample was too bulky to give reliable data. Furthermore, FIGS. 12 to 15 show the dispersing states of the fine carbon fiber of Example B1-6 with a pulverization time of 20 hours and electrical conductivity assisting materials of Reference Example B1, Comparative Example B2 and Comparative Example B3, in the carbon-coated low-conductivity solid LiFePO$_4$, respectively. As seen in FIG. 12, the fine short carbon fiber of the present invention is evenly dispersed and adhere to the carbon-coated low-conductivity solid LiFePO$_4$ particles. In FIG. 13, there were a small number of fine carbon fibers which can be observed in the surface of the carbon-coated low-conductivity solid LiFePO$_4$ particles. The fact indicates that short fine carbon fibers before fiber shortening are not dispersed but localized. In FIG. 14, acetylene black is substantially evenly dispersed, but a rate of acetylene black adhering to the surface of the carbon-coated low-conductivity solid LiFePO$_4$ particles is lower than that in the fine short fiber in FIG. 12 and dispersibility is also inferior to that. In FIG. 15, Ketjen black is also substantially evenly dispersed, but most of Ketjen black particles are present in spaces between the carbon-coated low-conductivity solid LiFePO$_4$ particles, and in terms of even dispersibility, it is inferior to the fine short carbon fiber in FIG. 12.

TABLE 2

| Experiment name | Ball milling time (hr) | graphite plane gap of conductive material (nm) | Thickness of stacked carbon layers of conductive material (nm) | True specific gravity of conductive material (g/cm$^3$) | Surface area of conductive material (m$^2$/g) |
| --- | --- | --- | --- | --- | --- |
| Example B1-1 | 1 | 0.3425 | 2.7 | 2.06 | 255 |
| Example B1-2 | 4 | 0.3425 | 2.8 | 2.06 | 257 |
| Example B1-3 | 8 | 0.3426 | 2.9 | 2.06 | 258 |
| Example B1-4 | 12 | 0.3427 | 3.0 | 2.07 | 260 |
| Example B1-5 | 16 | 0.3430 | 3.2 | 2.07 | 261 |
| Example B1-6 | 20 | 0.3432 | 3.2 | 2.07 | 261 |
| Reference Example B1 (fine carbon fiber) | None | 0.3424 | 2.7 | 2.05 | 250 |
| Comparative Example B2 (acetylene black) | None | 0.3370 | 2.8 | — | 69 |
| Comparative Example B3 (Ketjen black EC-600JD) | None | 0.3468 | — | — | 1365 |

As seen in Table 2, a carbon layer gap of the fine carbon fiber was 0.3424 nm, but by fiber shortening, a carbon layer gap of the fine short carbon fiber was slightly increased to 0.3432 nm (Examples B1-1 to B1-6). A thickness of the stacked carbon layers of the fine carbon fiber was 2.7 nm, but by fiber shortening, a thickness of the stacked carbon layers of the fine short carbon fiber was slightly increased to 3.2 nm (Examples B1-1 to B1-6). Furthermore, a true specific gravity of the fine carbon fiber was 2.05 g/cm$^3$, while a true specific gravity of the fine short carbon fiber after fiber shortening was slightly increased to 2.07 g/cm$^3$ (Examples B1-1 to B1-6). Generally, it may be expected that mechanical damage to a fiber is associated with fiber shortening, leading to considerable deterioration in carbon crystallinity in the fiber, but comprehensively judging from the above results, it can be said that fiber shortening gives damage to carbon crystallinity very little or in a negligible level. Furthermore, increase in a surface area associated with fiber shortening is within a level supposed as a theoretical value. That is, it can be concluded that fiber shortening proceeded to give a fine short carbon fiber, maintaining carbon crystallinity of the temple-bell-shaped structural unit aggregate in the fine carbon fiber before fiber shortening.

TABLE 3

| Experiment name | Ball milling time (hr) | Film structure (parts by weight) S | B | F | MF | AB | KJ | Film thickness (μm) | Film surface resistance (×10³Ω/□) |
|---|---|---|---|---|---|---|---|---|---|
| Blank Comparative Example | None | 100 | 5 | — | — | — | — | 58 | 13.5 |
| Example B1-1 | 1 | 100 | 5 | — | 5 | — | — | 75 | 6.2 |
| Example B1-2 | 4 | | | | | | | 73 | 3.1 |
| Example B1-3 | 8 | | | | | | | 70 | 1.4 |
| Example B1-4 | 12 | | | | | | | 68 | 1.3 |
| Example B1-5 | 16 | | | | | | | 65 | 1.0 |
| Example B1-6 | 20 | | | | | | | 64 | 0.9 |
| Reference Example B1 | None | 100 | 5 | 5 | — | — | — | 127 | 8.4 |
| Comparative Example B2 | None | 100 | 5 | — | — | 5 | — | 67 | 1.6 |
| Comparative Example B3 | None | 100 | 5 | — | — | — | 5 | 71 | 2.2 |

Film structure
S: Carbon coated LiFePO₄
B: Binder PVDF
F: Fine carbon fiber
MF: Fine short carbon fiber
AB: Acetylene black
KJ: Ketjen black EC-600JD As seen in Table 3, in comparison with a film surface resistance of $1.6 \times 10^3 \Omega/\square$ of acetylene black and a film surface resistance of $2.2 \times 10^3 \Omega/\square$ of Ketjen black which have been conventionally used as an excellent electrical conductivity assisting material, the fine short carbon fibers of Examples B1-5 and B1-6 have a surface resistance of $1.0 \times 10^3 \Omega/\square$ and $0.9 \times 10^3 \Omega/\square$, respectively, indicating that a fine short carbon fiber produced by fiber shortening acts as a more effective electrical conductivity assisting material. In Examples B1-1 to B1-6, as a pulverization time (a processing time by a ball mill) increased, a film thickness was reduced. It is because as fiber shortening proceeds, entangled fine carbon fibers are shred and disentangled and becomes less bulky and thus, a fine short carbon fiber after being shortened enters spaces between carbon-coated LiFePO₄ particles. In contrast, the fine carbon fiber used for Reference Example B1 exhibited inadequate dispersibility to be effective for promoting conductivity. It is because these carbon fibers form a secondary structure in which they are entangled each other, and in the dispersing method of this experiment, this secondary structure cannot be disentangled for dispersion.

Determination of a Particle Size Distribution

Variation in a fiber length depending on a ball milling time was observed using a particle size distribution measuring apparatus.

Preparation of a Sample for Determining a Particle Size Distribution

To an aqueous 0.015 wt % solution of Triton X-100 (dispersing agent, from Fisher Scientific Inc.) was added a fine carbon fiber or fine short carbon fiber to prepare a dilute slurry having a fiber concentration of 0.001 wt %, which was then subjected to a ultrasonic treatment by an ultrasonic dispersion apparatus for 4 min to prepare a dispersion liquid.

Apparatus: SALD-7000 particle size distribution measuring apparatus from Shimadzu Corporation, which uses a batch cell.

The measurement results are expressed as a relative particle amount distribution as sphere, and a diameter of the sphere is taken as fiber length.

FIG. 16(a) to (d) show ball milling times and variations in a particle size distribution. The distribution varied as follows depending on a ball milling time. In FIG. 16, (a) to (d) correspond to samples before ball milling, after 6-hour ball milling, after 12-hour ball milling and after 24-hour ball milling, respectively.

TABLE 4

| Ball milling time | 25% D | 50% D | 75% D |
|---|---|---|---|
| (a) Before ball milling | 0.276 μm | 0.358 μm | 0.547 μm |
| (b) 6 hrs | | 0.180 μm | |
| (c) 12 hrs | | 0.182 μm | |
| (d) 24 hrs | 0.132 μm | 0.162 μm | 0.197 μm |

INDUSTRIAL USABILITY

There are provided a fine carbon fiber and/or a fine short carbon fiber that have/has improved dispersibility and kneading properties in forming a composite with a polymer and/or a powder, which in turn attains a composite having excellent processability, and allows a composite exhibiting excellent functions such as conductivity, thermal conductivity, slide properties and reinforcement, as well as a process for efficiently manufacturing them.

The invention claimed is:

1. A process for manufacturing a fine carbon fiber comprising:
   feeding a mixed gas containing CO and H₂ onto a catalyst to initiate a reaction for growing the fine carbon fiber, the catalyst containing an oxide of cobalt having a spinel crystal structure in which magnesium is contained by substitution forming solid solution,
   wherein the fine carbon fiber comprises a graphite plane consisting solely of carbon atoms that form a temple-bell-shaped structural unit having a body with two ends, one open and one closed, wherein an angle formed by a generatrix of the body and a fiber axis is less than 15°, wherein 2 to 30 of the temple-bell-shaped structural units are stacked sharing a common central axis to form multiple aggregates each having a head and a tail, and wherein the head of at least one aggregate is connected to the tail of at least one other aggregate to form the fiber.

2. The process for manufacturing a fine carbon fiber according to claim 1, wherein the oxide of cobalt having a spinel crystal structure is represented by $Mg_xCo_{3-x}O_y$, in which "x" represents a solid solution range of magnesium of 0.5 to 1.5.

3. The process for manufacturing a fine carbon fiber according to claim 1, wherein in the oxide of cobalt having a spinel crystal structure, a crystal lattice constant "a" (cubic system) is 0.811 to 0.818 nm as determined by X-ray diffraction measurement.

4. The process for manufacturing a fine carbon fiber according to claim 1, wherein a volume ratio of $CO/H_2$ in the mixed gas is within the range of 70/30 to 99.9/0.1 and a reaction temperature is within the range of 400 to 650° C.

5. The process for manufacturing a fine carbon fiber according to claim 1, wherein an end of the body of at least one aggregate has an outer diameter D of 5 to 40 nm, an inner diameter d of 3 to 30 nm, and an aspect ratio (L/D) of 2 to 30.

6. The process for manufacturing a fine carbon fiber according to claim 1, wherein an ash content of the fine carbon fiber is no more than 4% by weight.

7. The process for manufacturing a fine carbon fiber according to claim 1, wherein a peak half width W (unit: degree) of 002 plane in the fine carbon fiber is 2 to 4 as determined by X-ray diffractometry.

8. The process for manufacturing a fine carbon fiber according to claim 1, wherein a graphite plane gap (d002) of the fine carbon fiber is 0.341 to 0.345 nm as determined by X-ray diffractometry.

9. A process for manufacturing a fine short carbon fiber, comprising preparing a fine carbon fiber by the manufacturing process according to claim 1 and then applying shear stress to the fiber for shortening.

* * * * *